United States Patent
Notake et al.

[11] Patent Number: 6,006,626
[45] Date of Patent: Dec. 28, 1999

[54] STRUCTURE FOR CONTROLLING DISPLACEMENT OF VEHICLE PEDAL

[75] Inventors: Jirou Notake, Toyota; Yoshihisa Kato, Aichi-ken; Hideki Hamada, Okazaki, all of Japan

[73] Assignee: Toyota Jidosha Kabushiki Kaisha, Toyota, Japan

[21] Appl. No.: 08/857,253

[22] Filed: May 16, 1997

[30] Foreign Application Priority Data

| May 29, 1996 | [JP] | Japan | 8-135571 |
| Feb. 20, 1997 | [JP] | Japan | 9-036574 |

[51] Int. Cl.⁶ .......................... B60K 28/10; B60K 23/02; B60T 7/12
[52] U.S. Cl. .............................. 74/512; 74/560; 180/274; 180/275
[58] Field of Search ................. 74/512, 513, 560, 74/522, 561, 562; 180/274, 275

[56] References Cited

U.S. PATENT DOCUMENTS

| 3,025,713 | 3/1962 | Koshaba et al. | 74/478 |
| 3,911,760 | 10/1975 | Elbers et al. | 74/512 |
| 5,078,024 | 1/1992 | Cicotte et al. | 74/512 |
| 5,086,663 | 2/1992 | Asano et al. | 74/512 |
| 5,460,061 | 10/1995 | Redding et al. | 74/512 |
| 5,555,774 | 9/1996 | Lauring et al. | 74/512 |
| 5,615,749 | 4/1997 | Kato | 180/274 |

FOREIGN PATENT DOCUMENTS

| 4305290 | 9/1993 | European Pat. Off. . |
| 4340633 | 6/1994 | European Pat. Off. . |
| 0 719 697 A1 | 7/1996 | European Pat. Off. . |
| 39 04 616 A1 | 8/1989 | Germany . |
| 43 05 290 A1 | 9/1993 | Germany . |
| 56-163973 | 12/1981 | Japan . |
| 1-73464 U | 5/1989 | Japan . |
| 8-175346 | 7/1996 | Japan . |
| 2031814 | 4/1980 | United Kingdom ................. 74/512 |

*Primary Examiner*—Vinh T. Luong
*Attorney, Agent, or Firm*—Oliff & Berridge, PLC

[57] ABSTRACT

A structure for controlling displacement of a vehicle pedal includes: a pedal bracket supporting a rotating shaft portion of a suspended-type vehicle pedal, a front end portion of the pedal bracket being joined to a first vehicle structural member which deforms substantially toward a rear of a vehicle when an external force of a predetermined value or greater is applied to a front portion of the vehicle, and a rear end portion of the pedal bracket being joined to a second vehicle structural member which is disposed at a substantially vehicle rear side of the first vehicle structural member; a separating device for canceling a joined state of the rear end portion of the pedal bracket and the second vehicle structural member by the pedal bracket being displaced substantially toward the rear of the vehicle, so as to separate the rear end portion of the pedal bracket and the second vehicle structural member; and a displacement controlling device disposed in a vicinity of the rear end portion of the pedal bracket, for controlling displacement of a stepping surface of the vehicle pedal by regulating displacement, in a substantially vehicle transverse direction, of the rear end portion of the pedal bracket which rear end portion has been separated from the second vehicle structural member.

14 Claims, 24 Drawing Sheets

STRUCTURE FOR CONTROLLING DISPLACEMENT OF VEHICLE PEDAL

BACKGROUND OF THE INVENTION

1. Field of the Invention

The present invention relates to a structure for controlling the displacement of a vehicle pedal.

2. Description of the Related Art

Various conventional structures have been devised as countermeasures for the time an external force of a predetermined value or greater is applied from the front of a vehicle. An example of such countermeasures is disclosed in Japanese Utility Model Application Laid-Open (JP-U) No. 1-73464.

To briefly explain the structure disclosed in JP-U No. 1-73464, as illustrated in FIG. 24, a steering column 402 which covers a steering shaft 400 is supported at a vehicle body by a tilt bracket 408 and a shaft 410. The tilt bracket 408 is formed from an upper plate member 404 and a pair of side plate members 406. The shaft 410 passes through the side plate members 406 and supports the lower side of the steering column 402.

A knee protector 412, which is shaped as a substantially circular arc-shaped surface and is elastically deformable, is disposed beneath the tilt bracket 408. The knee protector 412 is elastically supported at the lower side of the steering column 402 via an elastically deformable stay 414.

In accordance with the above-described structure, when an external force of a predetermined value or greater is applied from the front of the vehicle, a vehicle occupant starts to inertially move toward the front of the vehicle, and accordingly, the legs of the vehicle occupant start to inertially move in the same direction while bending with the knees as the starting point of bending. Therefore, if the knee protector 412 were not provided, the driver's knees might contact the tilt bracket 408. However, if the knee protector 412 is provided beneath the tilt bracket 408 as described above, the driver's knees only contact the knee protector 412.

This structure in which the knee protector 412 is provided is useful as a countermeasure at the time that an external force of a predetermined value or greater is applied from the front of the vehicle. However, countermeasures for protecting the legs of the vehicle occupant can also be studied from other points of view.

Other examples of conventional structures for controlling displacement of a vehicle pedal include German Patent No. 4,305,290, which discloses a structure for bending a pedal bracket upward and displacing a pedal upward, German Patent No. 4,340,633, which discloses a structure for rotating and displacing a pedal upward when a steering column is displaced toward the front of a vehicle, and Japanese Patent Application Laid-Open (JP-A) No. 8-175346, which discloses a structure for deforming a pedal bracket and displacing a pedal.

The present inventors conceived of the idea of the present invention from this standpoint, conducted various experiments, and arrived upon extremely effective countermeasures which control the displacement of a vehicle pedal such as a brake pedal at the time that an external force of a predetermined value or greater is applied from the front of the vehicle, by focusing on the deformation and the displacement behavior of the body panel and the like at the time such an external force is applied.

SUMMARY OF THE INVENTION

In view of the aforementioned, an object of the present invention is to provide a structure for controlling displacement of a vehicle pedal which can control the displacement of the stepping surface of a vehicle pedal at the time that an external force of a predetermined value or greater is applied from the front of the vehicle.

A first aspect of the present invention is a structure for controlling displacement of a vehicle pedal, comprising: a pedal bracket supporting a rotating shaft portion of a suspended-type vehicle pedal, a front end portion of the pedal bracket being joined to a first vehicle structural member which deforms substantially toward a rear of a vehicle when an external force of a predetermined value or greater is applied to a front portion of the vehicle, and a rear end portion of the pedal bracket being joined to a second vehicle structural member which is disposed at a substantially vehicle rear side of the first vehicle structural member; separating means for canceling a joined state of the rear end portion of the pedal bracket and the second vehicle structural member by the pedal bracket being displaced substantially toward the rear of the vehicle, so as to separate the rear end portion of the pedal bracket and the second vehicle structural member; and displacement controlling means, disposed in a vicinity of the rear end portion of the pedal bracket, for controlling displacement of a stepping surface of the vehicle pedal by regulating displacement, in a substantially vehicle transverse direction, of the rear end portion of the pedal bracket which rear end portion has been separated from the second vehicle structural member.

A second aspect of the present invention is a structure for controlling displacement of a vehicle pedal in which, in the first aspect, the displacement controlling means is a regulating means which is inclined substantially toward a vehicle transverse direction outer side substantially along a direction toward the rear of the vehicle, and which is disposed at a position which interferes with a locus of movement of the rear end portion of the pedal bracket which rear end portion has been separated from the second vehicle structural member.

A third aspect of the present invention is a structure for controlling displacement of a vehicle pedal in which, in either the first or the second aspect, joined surfaces of the rear end portion of the pedal bracket and the second vehicle structural member are inclined substantially toward a bottom of the vehicle substantially along a direction toward the rear of the vehicle.

A fourth aspect of the present invention is a structure for controlling displacement of a vehicle pedal in which, in the first aspect, the displacement controlling means is a guide means which guides the rear end portion of the pedal bracket, which rear end portion has been separated from the second vehicle structural member, substantially toward a vehicle transverse direction outer side substantially along a direction toward the rear of the vehicle.

A fifth aspect of the present invention is a structure for controlling displacement of a vehicle pedal in which, in the first aspect, the displacement controlling means is a pushing means which bridges the rear end portion of the pedal bracket and a vehicle body, the pushing means applying pushing force in a direction toward a substantially vehicle transverse direction outer side to the rear end side of the pedal bracket by swinging around a region at which the pushing means is joined to the vehicle body.

A sixth aspect of the present invention is a structure for controlling displacement of a vehicle pedal in which, in the first aspect, the displacement controlling means is a regulating means in which an angle of inclination, with respect to the substantially vehicle transverse direction, of a wall surface of a rear portion wall of the regulating means is set greater than an angle of inclination, with respect to the substantially vehicle transverse direction, of a wall surface of a front portion wall of the regulating means.

A seventh aspect of the present invention is a structure for controlling displacement of a vehicle pedal in which, in any of the fourth through the sixth aspects, joined surfaces of the rear end portion of the pedal bracket and the second vehicle structural member are inclined substantially toward a bottom of the vehicle substantially along a direction toward the rear of the vehicle.

In accordance with the first aspect of the present invention, when an external force of a predetermined value or greater is applied to the front portion of the vehicle, the first vehicle structural member is displaced substantially toward the rear of the vehicle. As a result, the pedal bracket, whose front end portion is joined to the first vehicle structural member is displaced in the same direction. At this time, the joined state of the rear end portion of the pedal bracket and the second vehicle structural member is canceled by the separating means, and the rear end portion of the pedal bracket separates from the second vehicle structural member. The displacement of the rear end portion of the pedal bracket, which rear end portion has been separated, is regulated, in the substantially transverse direction of the vehicle, by the displacement controlling means which is disposed in a vicinity of the rear end portion of the pedal bracket. The rotating shaft portion of the suspended-type vehicle pedal is supported at the pedal bracket. Therefore, the displacement of the rear end portion of the pedal bracket in the substantially transverse direction of the vehicle is regulated to a desired displacement, and the displacement of the stepping surface of the vehicle pedal when an external force of a predetermined value or greater is applied to the front portion of the vehicle is also controlled.

Due to the rear end portion of the pedal bracket separating from the second vehicle structural member when an external force of a predetermined value or greater is applied to the front portion of the vehicle, a relatively large load can be prevented from being input to the second vehicle structural member via the pedal bracket.

In accordance with the first aspect, the displacement, in the substantially transverse direction of the vehicle, of the rear end side of the pedal bracket is regulated. Therefore, a superior effect is achieved in that the rear end side of the pedal bracket which has been separated is prevented from interfering with other parts which are disposed rearward of the rear end side of the pedal bracket (e.g., the steering support fixed to the instrument panel reinforcement).

In accordance with the second aspect of the present invention, when the rear end side of the pedal bracket separates from the second vehicle structural member, the rear end side interferes with the regulating means. Because the regulating means is inclined substantially toward the vehicle transverse direction outer side substantially along the direction toward the rear of the vehicle, the rear end side of the pedal bracket is displaced substantially toward the vehicle transverse direction outer side while sliding along the direction of inclination of the regulating means. In this way, displacement of the stepping surface of the vehicle pedal when external force of a predetermined value or greater is applied to the front portion of the vehicle can also be controlled.

In accordance with the second aspect, only the regulating means which is inclined substantially toward the vehicle transverse direction outer side substantially along the direction toward the rear of the vehicle is used. Therefore, the structure is simple and is advantageous in that it does not require much space.

In accordance with the third aspect of the present invention, the joining surface of the rear end portion of the pedal bracket and the second vehicle structural member is inclined substantially toward the bottom of the vehicle substantially along the direction toward the rear of the vehicle. Therefore, when an external force of a predetermined value or greater is applied to the front of the vehicle and the joined state of the pedal bracket rear end portion and the second vehicle structural member is canceled by the separating means, the rear end portion of the pedal bracket separates along the surface direction of the joining surface of the rear end portion of the pedal bracket and the second vehicle structural member. Therefore, because the rear end portion of the pedal bracket is displaced substantially downward, the pedal bracket is pivoted and displaced substantially toward the front of the vehicle as seen in side view. The displacement of the rear end portion of the pedal bracket is regulated in the substantially transverse direction of the vehicle by the displacement controlling means (regulating means). Accordingly, in the present invention, while the rear end portion of the pedal bracket is displaced substantially toward the bottom of the vehicle, the displacement in the substantially transverse direction of the vehicle can be regulated to a desired displacement. Further, a superior effect is achieved in that control is effected such that, when an external force of a predetermined value or greater is applied to the front portion of the vehicle, the stepping surface of the vehicle pedal is actively displaced substantially toward the front of the vehicle and the displacement in the substantially transverse direction of the vehicle is as desired.

In accordance with the fourth aspect of the present invention, when the rear end portion of the pedal bracket separates from the second vehicle structural member, the rear end portion is guided and displaced substantially toward the vehicle transverse direction outer side by the guiding means. In this way, the displacement of the stepping surface of the vehicle pedal when an external force of a predetermined value or greater is applied to the front portion of the vehicle can be controlled.

Further, in accordance with the present invention, the rear end portion of the pedal bracket after separating is displaced substantially toward the vehicle transverse direction outer side by the guiding means. Therefore, the rear end portion of the pedal bracket is reliably displaced substantially toward the vehicle transverse direction outer side along the guide path formed by the guiding means. Namely, it is difficult for deviation to occur in the direction of displacing the rear end portion of the pedal bracket substantially toward the vehicle transverse direction outer side. Further, a superior effect is achieved in that the rear end side of the pedal bracket, and therefore the stepping surface of the vehicle pedal, is displaced in a desired direction.

In accordance with a fifth aspect of the invention, when the rear end portion of the pedal bracket separates from the second vehicle structural member, the pushing means, which is suspended between the rear end portion of the pedal bracket and the vehicle body, swings around the region at which the pushing means is joined to the vehicle body. In this way, pressing force substantially toward the vehicle transverse direction outer side is applied to the rear end portion of the pedal bracket by the pushing means. Accordingly, the rear end portion of the pedal bracket, which rear end portion has been separated, is displaced substantially toward the vehicle transverse direction outer side by the pushing means. In this way, the displacement of the stepping surface of the vehicle pedal when external force of a predetermined value or greater is applied to the vehicle front portion is controlled.

In accordance with the present invention, pressing force substantially toward the vehicle transverse direction outer side is applied to the rear end portion of the pedal bracket by the swinging operation of the pushing means, and the rear end portion of the pedal bracket is displaced substantially toward the vehicle transverse direction outer side. Therefore, if the radius of gyration of the pushing means is set short, the amount of displacement of the rear end portion of the pedal bracket substantially toward the vehicle transverse direction outer side is made small. Further, if the radius of gyration of the pushing means is set long, the amount of displacement of the rear end portion of the pedal bracket substantially toward the vehicle transverse direction outer side is made large. Therefore, a superior effect is achieved in that the amount of displacement of the rear end side of the pedal bracket substantially toward the vehicle transverse direction outer side can be adjusted arbitrarily by adjusting the setting of the radius of gyration of the pushing means.

In accordance with a sixth aspect of the present invention, when the rear end portion of the pedal bracket separates from the second vehicle structural member, the rear end portion swings from the front portion wall side of the regulating means toward the rear portion wall side. Here, in the present invention, the angle of inclination of the wall surface of the rear portion wall of the regulating means with respect to the substantially transverse direction of the vehicle is set to be greater than the angle of inclination of the wall surface of the front portion wall of the regulating means with respect to the substantially transverse direction of the vehicle. Therefore, as the rear end portion of the pedal bracket slides from the front portion wall of the regulating means on the wall surface of the rear portion wall, the rear end portion of the pedal bracket is displaced substantially toward the vehicle transverse direction outer side in accordance with the difference in the angles of inclination. In this way, the displacement of the stepping surface of the vehicle pedal at the time when an external force of a predetermined value or greater is applied to the front portion of the vehicle can be controlled.

In the present invention, the angle of inclination, with respect to the substantially vehicle transverse direction, of the wall surface of the rear portion wall of the regulating means is set to be greater than the angle of inclination, with respect to the substantially vehicle transverse direction, of the wall surface of the front portion wall of the regulating means. Therefore, the structure is simple, and is advantageous in that it requires little space.

In the invention of the seventh aspect, the joined surfaces of the rear end portion of the pedal bracket and the second vehicle structural member are inclined substantially toward the bottom of the vehicle substantially along a direction toward the rear of the vehicle. Therefore, in the same way as in the third aspect of the present invention, the rear end portion of the pedal bracket is displaced substantially toward the vehicle transverse direction outer side while being displaced substantially toward the bottom of the vehicle. Therefore, the displacement of the stepping surface of the vehicle pedal is controlled. A superior effect is achieved in that, when an external force of a predetermined value or greater is applied to the front portion of the vehicle, the stepping surface of the vehicle pedal is actively displaced substantially toward the front of the vehicle and substantially toward the vehicle transverse direction outer side as well.

DESCRIPTION OF THE PREFERRED EMBODIMENTS

Figure 1:
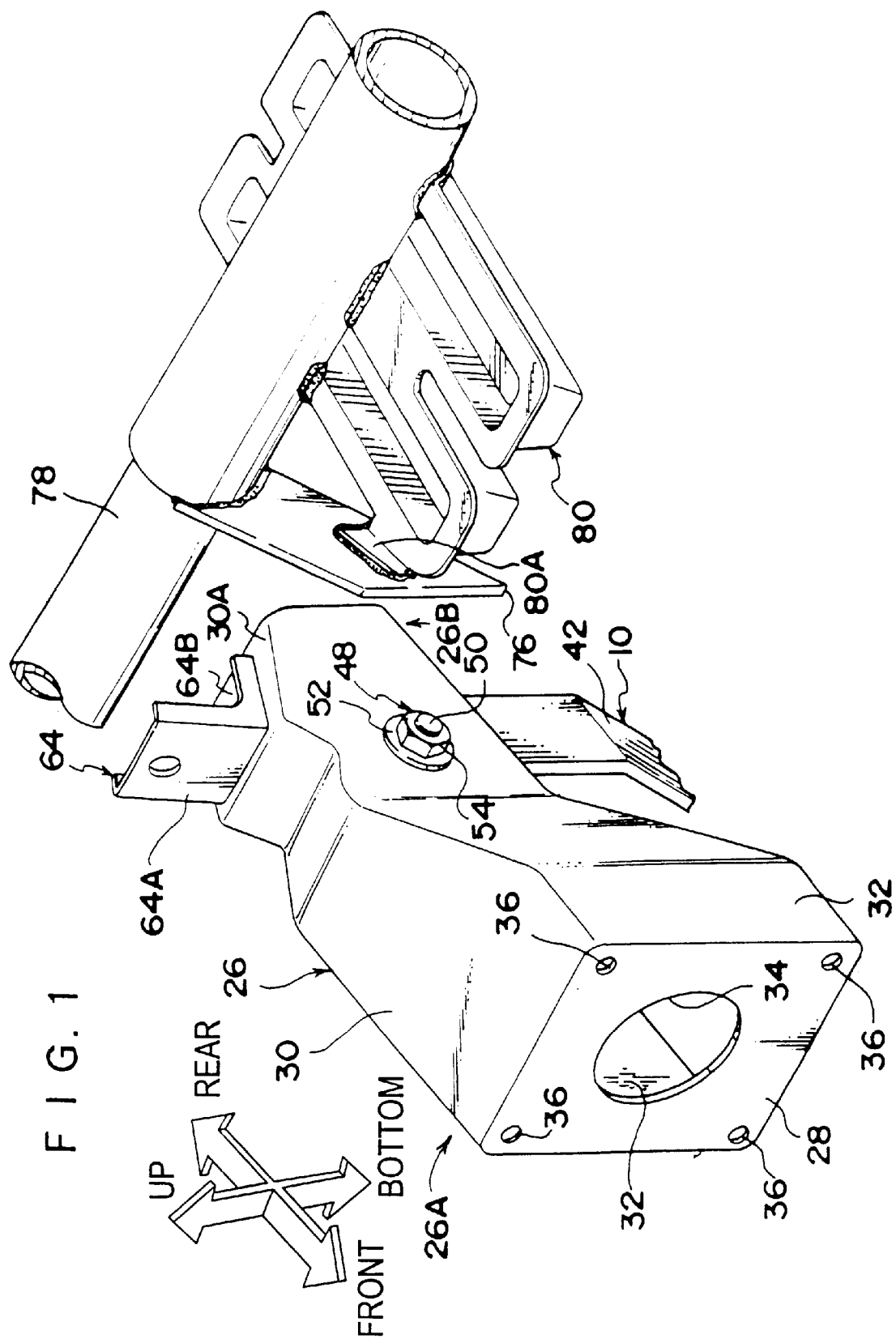
FIG. 1 is a perspective view illustrating main portions of a structure for controlling the displacement of a vehicle pedal relating to a first embodiment.

A first embodiment of the present invention will be described hereinafter with reference to FIGS. 1 through 5. Note that, for all of the embodiments, in the drawings, the arrow FRONT points in a direction toward the front of the vehicle, and the arrow UP points in a direction toward the top of the vehicle. The arrow REAR points in a direction opposite to the front pointing arrow toward the rear of the vehicle.

Figure 3:
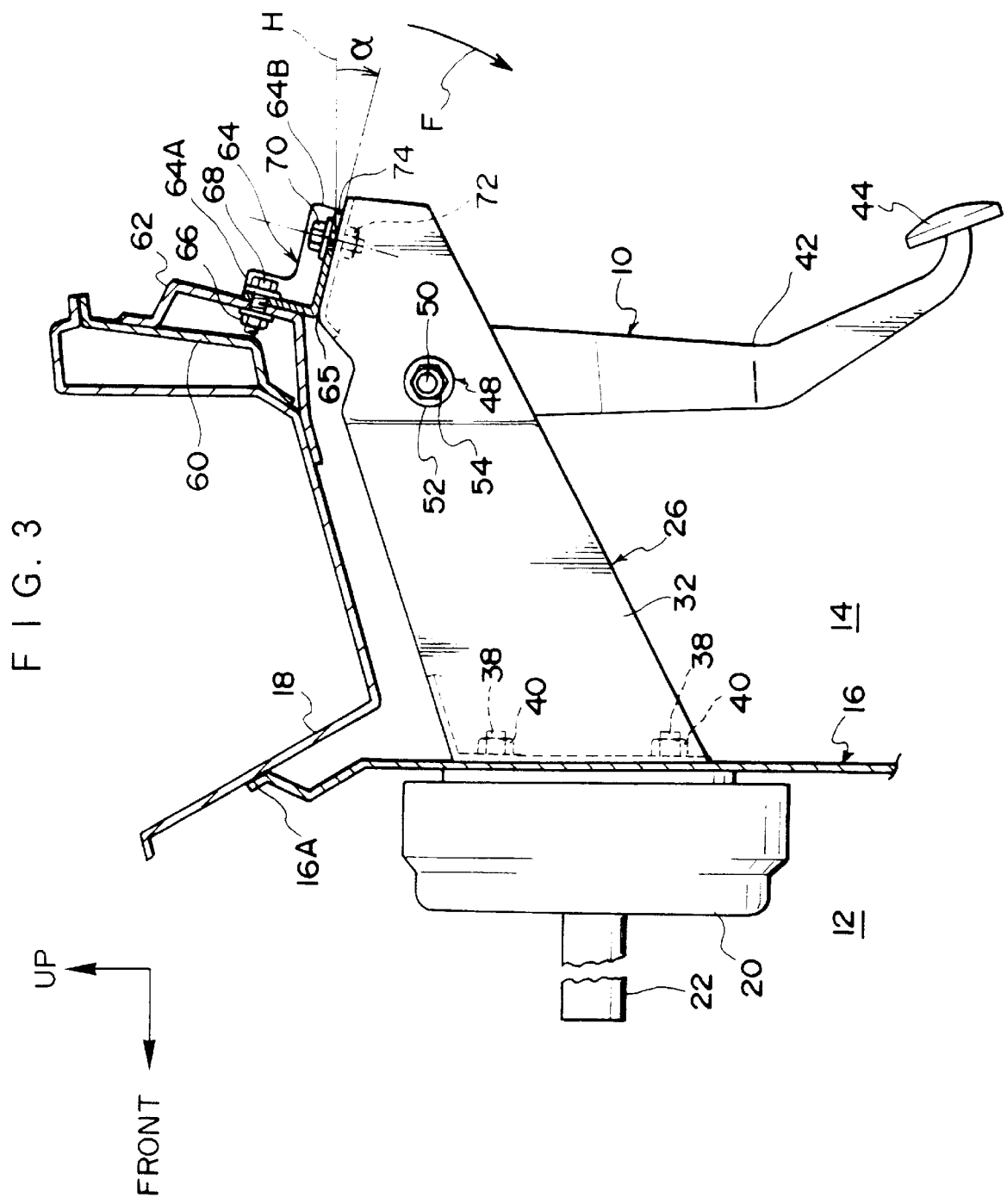
FIG. 3 is a side view illustrating the overall structure of the structure for controlling the displacement of a vehicle pedal illustrated in FIG. 1 in a state in which regulating plates and the like have been removed.
Figure 4:
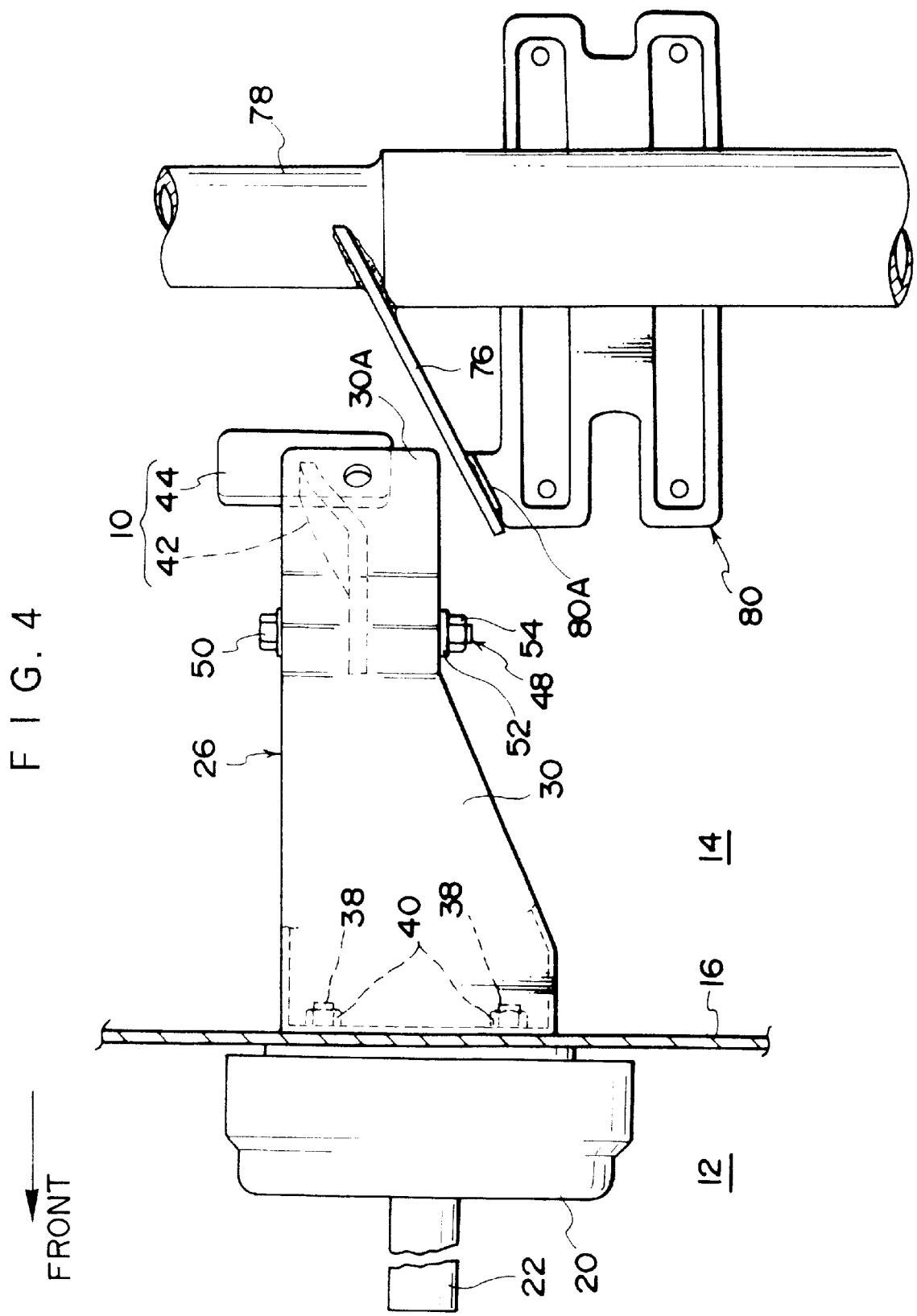
FIG. 4 is a plan view illustrating a state before an external force of a predetermined value or greater is applied from the front of the vehicle in the first embodiment.
Figure 5:
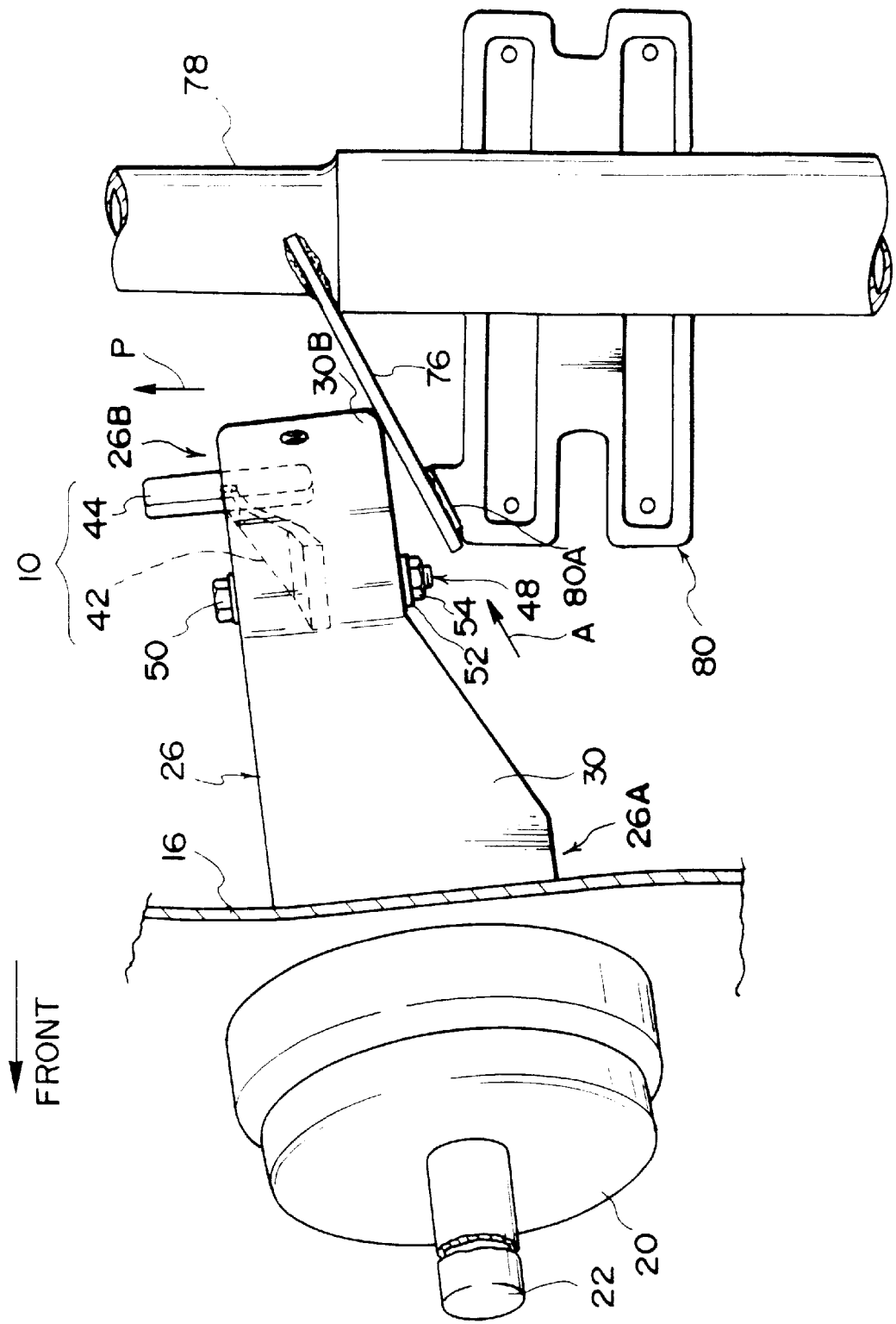
FIG. 5 is a plan view illustrating a state after an external force of a predetermined value or greater is applied from the front of the vehicle in the first embodiment.

The structure of the periphery of a suspended-type brake pedal 10 as viewed from the side is illustrated schematically in FIG. 3, which shows the portion of the vehicle relevant to this invention. First, the overall structure of the periphery of the brake pedal 10 will be described with reference mainly to FIG. 3.

A dash panel 16 is disposed at a position at which the dash panel 16 partitions an engine room 12 and a vehicle compartment interior space 14, such that the surface direction of the dash panel 16 is substantially vertical. An upper end portion 16A of the dash panel 16 is fixed by spot welding or the like to the vehicle front side surface of a cowl inner panel 18 which forms a portion of the cowl and which is disposed such that the longitudinal direction thereof is the transverse direction of the vehicle (i.e., the direction normal to the plane of the paper in FIG. 3). The lower end portion of the dash panel 16 is fixed by spot welding or the like to an unillustrated floor panel.

A brake booster 20, a master cylinder 22, and an unillustrated reservoir tank are disposed integrally at the side of the dash panel 16 toward the front of the vehicle. The brake booster 20 augments the stepping force of the driver applied to the brake pedal 10. The master cylinder 22 converts the pressure augmented by the brake booster 20 into hydraulic pressure. The reservoir tank houses and replenishes brake fluid in accordance with changes in the volume of the hydraulic pressure system.

Figure 2:
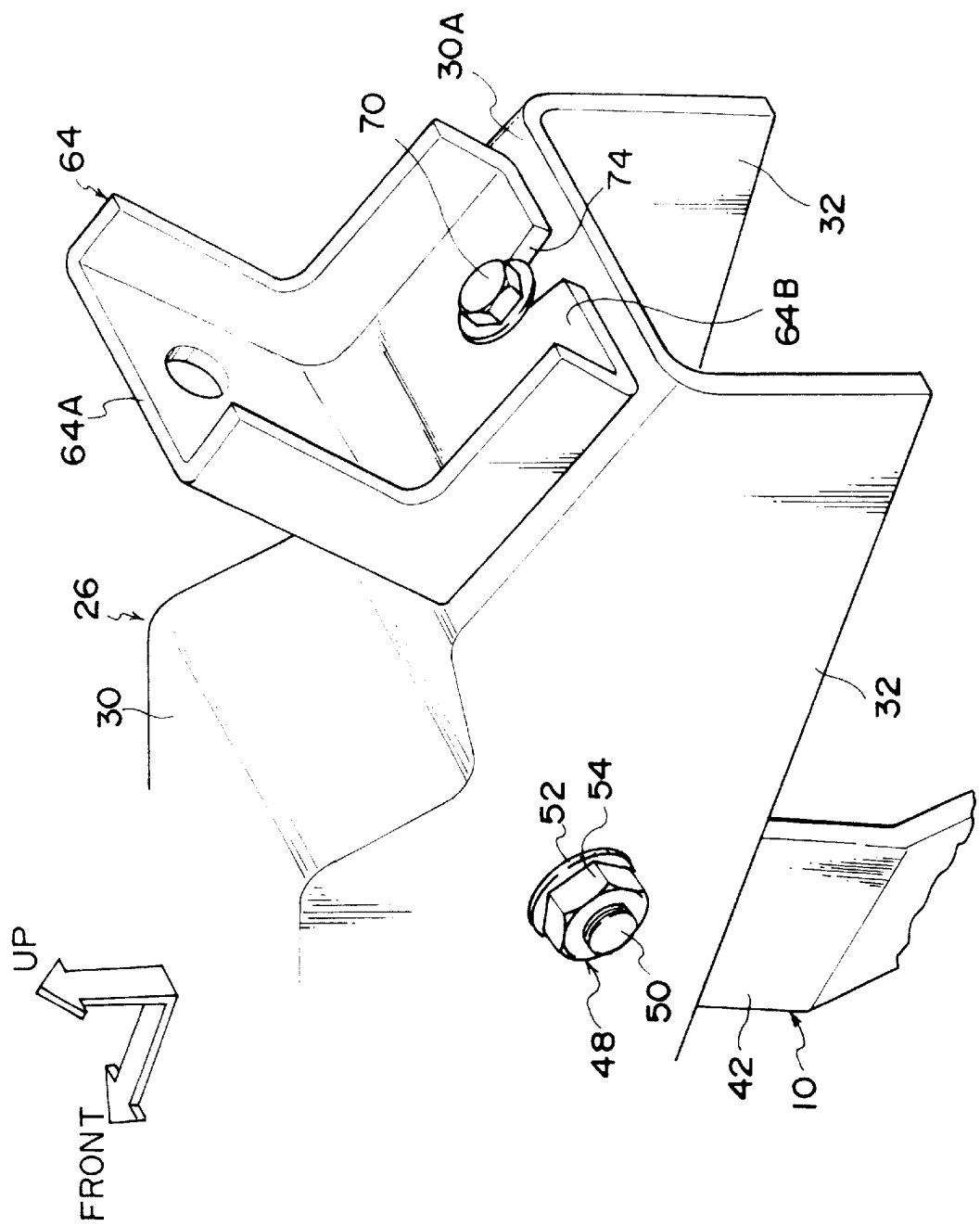
FIG. 2 is an enlarged perspective view of a separating structure of the structure for controlling the displacement of a vehicle pedal illustrated in FIG. 1.

A pedal bracket 26 which swingably supports the brake pedal 10 is disposed at the side of the dash panel 16 toward the rear of the vehicle. As illustrated in FIGS. 1 and 2, the pedal bracket 26 includes a base plate portion 28, a top plate portion 30, and a pair of side plate portions 32. The base plate portion 28 forms the surface for mounting the pedal bracket 26 to a first vehicle structural member or the dash panel 16. The top plate portion 30 extends substantially toward the rear of the vehicle from the top edge of the base plate portion 28. The pair of side plate portions 32 extend parallel to one another substantially toward the rear of the vehicle from the vehicle transverse direction side edges of the base plate portion 28. Accordingly, the pedal bracket 26 on the whole is formed so as to be long substantially along the longitudinal direction of the vehicle and so as to have a U-shaped cross-section which is open toward the bottom. In the present first embodiment, the pedal bracket 26 is formed integrally by bending a single plate appropriately. However, a structure in which the respective portions are formed by respective parts which are made integral by welding or the like may also be employed.

The structure for fixing the front end side 26A of the pedal bracket 26 will be described hereinafter. A mounting hole 34 of a predetermined radial dimension is formed in the central portion of the base plate portion 28. A bolt through-hole 36 is formed in each of the four corners of the base plate portion 28. In a state in which the base plate portion 28 is abutted against the dash panel 16 (a dash insulator which serves as a soundproofing material and is fit tightly to the dash panel 16 is omitted from the figures), stud bolts 38 which project from the brake booster 20 are inserted relatively into the bolt through-holes 36 of the base plate portion 28. Nuts 40 are screwed with the stud bolts 38 from the rear side of the base plate portion 28. In this way, the front end side 26A of the pedal bracket 26 is joined and fixed to the dash panel 16. Another method of fixing may be used in which weld nuts are welded in advance to the front side surface of the dash panel 16, and mounting bolts are screwed into the weld nuts from the base plate portion 28 side.

The fixing structure of the rear end side 26B of the pedal bracket 26 will be described hereinafter. A cowl inner reinforcement 60 for increasing rigidity is fixed by spot welding or the like to the rear side surface of a second vehicle structural member or the cowl inner panel 18. The cowl inner reinforcement 60 and the rear side surface of the cowl inner panel 18 together form a closed cross-section. A bracket 62 is fixed by spot welding or the like to the rear side surface of the cowl inner reinforcement 60 and to the bottom surface of the cowl inner panel 18. An upper end portion 64A of an angled mounting bracket 64 is fixed to the bracket 62 by a weld nut 66 and a fixing bolt 68. A lower end portion 64B of the mounting bracket 64 and a rear end portion 30A of the top plate portion 30 are joined and fixed together by a fixing bolt 70 and a weld nut 72. In this way, the rear end side 26B of the pedal bracket 26 is fixed to the mounting bracket 64.

The brake pedal 10 is disposed between the pair of side plate portions 32 of the pedal bracket 26. The brake pedal 10 includes a pedal supporting portion 42 and a pedal pad 44. The pedal supporting portion 42 is formed by appropriately bending a narrow plate member. The pedal pad 44 forming a stepping surface is provided at the bottom end portion of the pedal supporting portion 42 and the stepping force of the driver is applied thereto. An unillustrated return spring is anchored to the pedal supporting portion 42 of the brake pedal 10 so as to always urge the brake pedal 10 to return to its original position. The distal end portion of an unillustrated push rod (operating rod), which projects from the brake booster 20 and passes through the dash panel 16, is connected to an intermediate portion of the pedal supporting portion 42 of the brake pedal 10 by an unillustrated clevis and clevis pin such that the push rod can rotate freely relatively to the pedal supporting portion 42.

A rotating shaft portion 48 is provided at the upper end portion of the pedal supporting portion 42 of the brake pedal 10. The rotating shaft portion 48 is shaft-supported at the pair of side-plate portions 32 of the pedal bracket 26. An example of the structure of the rotating shaft portion 48 is as follows. A substantially cylindrical pedal boss is inserted into a through hole formed in the upper end portion of the pedal supporting portion 42. A cylindrical bush is fit in each end portion of the pedal boss. A cylindrical collar is inserted into both bushes. Thereafter, a mounting bolt 50 is inserted from the outer side of one of the side plate portions 32. A nut 54 is screwed together with the mounting bolt 50 via a washer 52 from the outer side of the other side plate portion 32.

As illustrated in the enlarged view of FIG. 2, a substantially V-shaped slit 74 is formed in the lower end portion 64B of the mounting bracket 64. At the proximal end portion of the slit 74, the rear end portion 30A of the base plate portion 30 of the pedal bracket 26 is joined to the lower end portion 64B of the mounting bracket 64 by the fixing bolt 70.

Accordingly, when the fixing position of the fixing bolt 70 is at the proximal end portion of the slit 74, the rear end portion 30A of the top plate portion 30 of the pedal bracket 26 is not separated from the lower end portion 64B of the mounting bracket 64. In a case in which the pedal bracket 26 is displaced substantially toward the rear of the vehicle with respect to the mounting bracket 64, the rear end portion 30A of the top plate portion 30 separates from the lower end portion 64B of the mounting bracket 64.

As illustrated in FIG. 3, the joined surfaces 65 of the rear end portion 30A of the top plate portion 30 of the pedal bracket 26 and the lower end portion 64B of the mounting bracket 64 are inclined substantially toward the bottom of the vehicle by a predetermined angle a with respect to a horizontal plane H.

In the present first embodiment, as illustrated in FIG. 1, a regulating plate 76 is disposed at the rear side of the pedal bracket 26. More specifically, a pipe-shaped instrument panel reinforcement 78 is disposed along the transverse direction of the vehicle at the rear side of the pedal bracket 26. A tray-shaped steering support 80, which supports an unillustrated steering column at four points, is fixed by welding to predetermined positions of the lower surface of the instrument panel reinforcement 78. A mounting portion 80A having an L-shaped cross-section is formed integrally with the front end portion of the steering support 80. One end of the rectangular regulating plate 76 is disposed at the mounting portion 80A whereas the other end is disposed at a predetermined region of the instrument panel reinforcement 78 which region is further toward the vehicle transverse direction outer side than the steering support 80. Accordingly, the regulating plate 76 is inclined substantially toward the vehicle transverse direction outer side substantially along a direction toward the rear side of the vehicle. Further, the regulating plate 76 and the rear end sides of the side plate portions 32 of the pedal bracket 26 are separated from one another. In this way, the positional relationships of the regulating plate 76 and the pedal bracket 26 are set such that the regulating plate 76 does not interfere when the pedal bracket 26 is displaced substantially toward the rear of the vehicle.

Next, the operation and effects of the present first embodiment will be described.

As conventionally known, when the brake is not operated, the brake pedal 10 is maintained at its initial position by the urging force of a return spring. In this state, when the driver applies stepping force to the pedal pad 44 of the brake pedal 10, the brake pedal 10 swings substantially toward the front of the vehicle around the rotating shaft portion 48, and the unillustrated push rod is pushed substantially toward the front of the vehicle. In this way, the stepping force of the driver applied to the pedal pad 44 is augmented by the brake booster 20.

Operation of the present first embodiment at the time an external force of a predetermined value or greater is applied from the front of the vehicle occurs in the following three stages.

First, the rear end portion 30A of the top plate portion 30 separates from the lower end portion 64B of the mounting bracket 64 due to the structure of the pedal bracket 26 separating from the mounting bracket 64 (i.e., the slit 74). More specifically, when an external force of a predetermined value or greater is applied from the front of the vehicle, the load at that time is input to the dash panel 16 via the master cylinder 22 and the brake booster 20. As a result, as illustrated in the plan view in FIG. 5, the dash panel 16 is displaced rearward substantially toward the rear of the vehicle. At this time, the fixing bolt 70, which joins the lower end portion 64B of the mounting bracket 64 and the rear end portion 30A of the top plate portion 30 of the pedal bracket 26, slides relatively along the longitudinal direction of the slit 74, and the rear end portion 30A of the top plate portion 30 separates from the lower end portion 64B of the mounting bracket 64. When an external force of a predetermined value or greater is applied to the front portion of the vehicle, the rear end side of the pedal bracket 26 separates from the mounting bracket 64 and therefore from the cowl inner reinforcement 60. In this way, a relatively large load can be prevented from being input to the cowl inner reinforcement 60 via the pedal bracket 26.

Next, rotational force F (see FIG. 3) around the base plate portion 28 and substantially toward the front of the vehicle is applied to the pedal bracket 26 because the joining surface 65 of the rear end portion 30A of the top plate portion 30 and the lower end portion 64B of the mounting bracket 64 is inclined substantially toward the bottom of the vehicle by a predetermined angle α with respect to the horizontal plane H. More specifically, when the rear end portion 30A of the top plate portion 30 separates from the lower end portion 64B of the mounting bracket 64, because the surface joining the rear end portion 30A and the lower end portion 64B is inclined substantially toward the bottom of the vehicle by the predetermined angle α with respect to the horizontal plane H, the rear end portion 30A of the top plate portion 30 slides along the lower end portion 64B of the mounting bracket 64, and the rear end side of the pedal bracket 26 is displaced substantially toward the bottom of the vehicle. Accordingly, rotating force F substantially toward the front of the vehicle (i.e., in the clockwise direction in FIG. 3) is applied to the pedal bracket 26 substantially around the base plate portion 28 as viewed from the side.

Next, a displacement force P (see FIG. 5) in the vehicle transverse direction is applied to the rear end side 26B of the pedal bracket 26 because the regulating plate 76, whose longitudinal direction is inclined substantially toward the outer side in the transverse direction of the vehicle substantially along a direction toward the rear end of the vehicle, is disposed at the vehicle rear side 26B of the pedal bracket 26. More specifically, when the rear end portion 30A of the top plate portion 30 at the pedal bracket 26 separates from the lower end portion 64B of the mounting bracket 64, the pedal bracket 26 receives rotational force F substantially toward the front of the vehicle while the rear end portion of the side plate portion 32 of the pedal bracket 26 abuts the regulating plate 76 due to the rearward displacement of the dash panel 16. Here, in the present first embodiment, because the regulating plate 76, which is inclined substantially toward the vehicle transverse direction outer side substantially along a direction toward the rear of the vehicle, is provided, the rear end portion of the side plate portion 32 slides along the direction along which the regulating plate 76 inclines (the direction of arrow A in FIG. 5). Therefore, displacement force P toward the side is applied to the rear end side of the pedal bracket 26.

In accordance with the present first embodiment, when external force of a predetermined value or greater is applied from the front of the vehicle, rotating force F substantially toward the front of the vehicle is applied to the pedal bracket 26 while displacement force P toward the side is applied to the rear end side of the pedal bracket 26. Therefore, the pedal pad 44 can be displaced substantially toward the front of the vehicle and substantially toward the outer side in the transverse direction of the vehicle. In other words, in the present first embodiment, when an external force of a predetermined value or greater is applied from the front of the vehicle, the pedal pad 44 can be controlled so as to be displaced substantially toward the front of the vehicle and substantially toward the vehicle transverse direction outer side. As a result, bending of the knee of the driver caused by inertial movement of the driver at the time an external force of a predetermined value or greater is applied from the front of the vehicle can be controlled, and therefore, the knee of the driver can be kept away from the steering column.

In accordance with the present first embodiment, the direction of displacement of the rear end side of the pedal bracket 26 is regulated to be a direction substantially toward the outer side in the transverse direction of the vehicle. Therefore, the rear end side of the side plate portion 32 of the pedal bracket 26 after separation can be prevented from interfering with other parts such as the steering support 80 or the like.

Moreover, in accordance with the present first embodiment, the regulating plate 76, which is inclined substantially toward the outer side in the transverse direction of the vehicle substantially along a direction toward the rear of the vehicle, is fixed only to the steering support 80 and the instrument panel reinforcement 78 which are parts which are already used in the vehicle. Therefore, the construction can be simplified, and the amount of space required for the structure can be reduced.

A second embodiment of the present invention relating to the first through third aspects of the invention will be described hereinafter with reference to FIGS. 6 and 7. Structural portions which are the same as those of the previously-described first embodiment are denoted by the same reference numerals, and description thereof is omitted.

Figure 6:
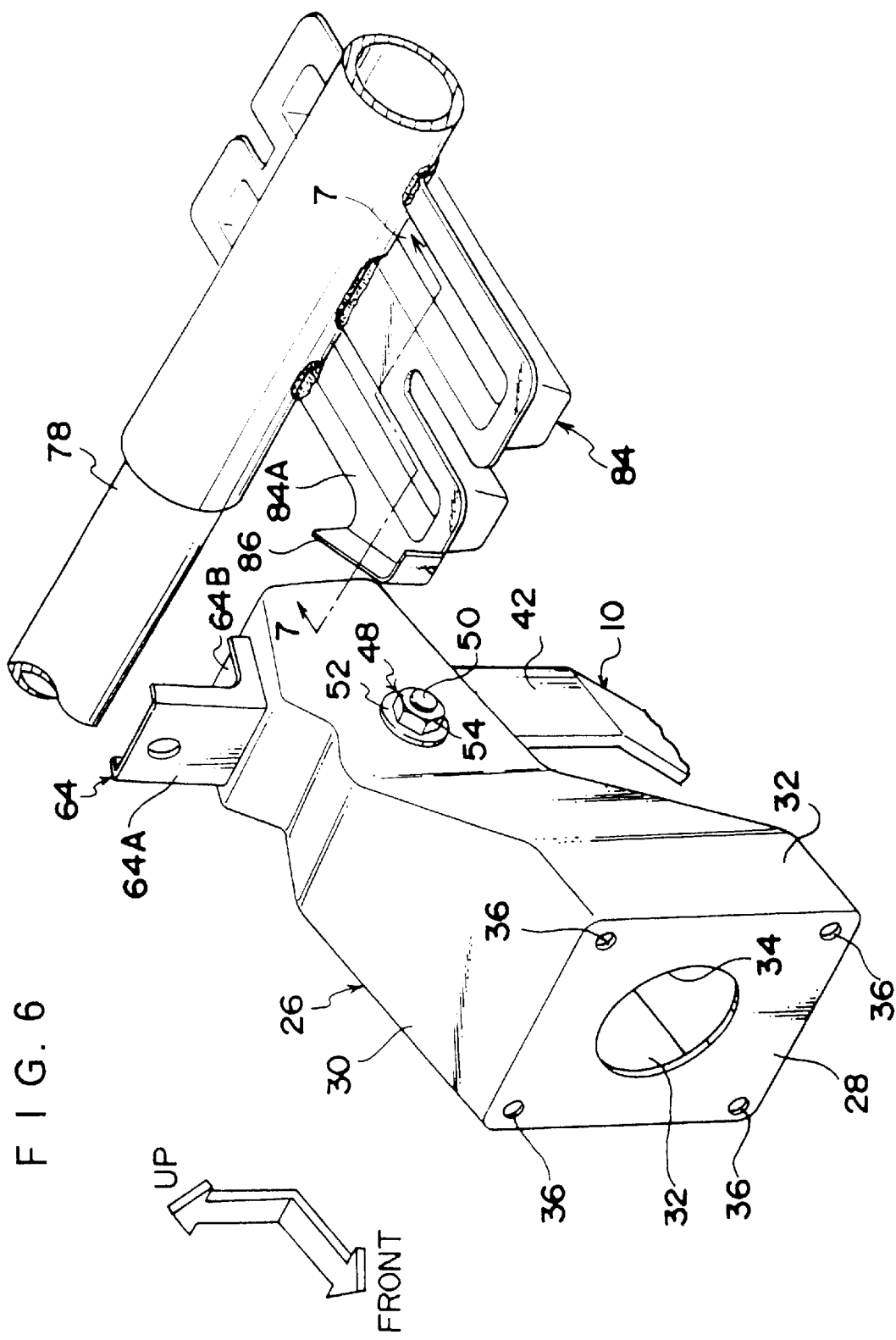
FIG. 6 is a perspective view corresponding to FIG. 1 and illustrating main portions of a structure for controlling the displacement of a vehicle pedal relating to a second embodiment.
Figure 7:
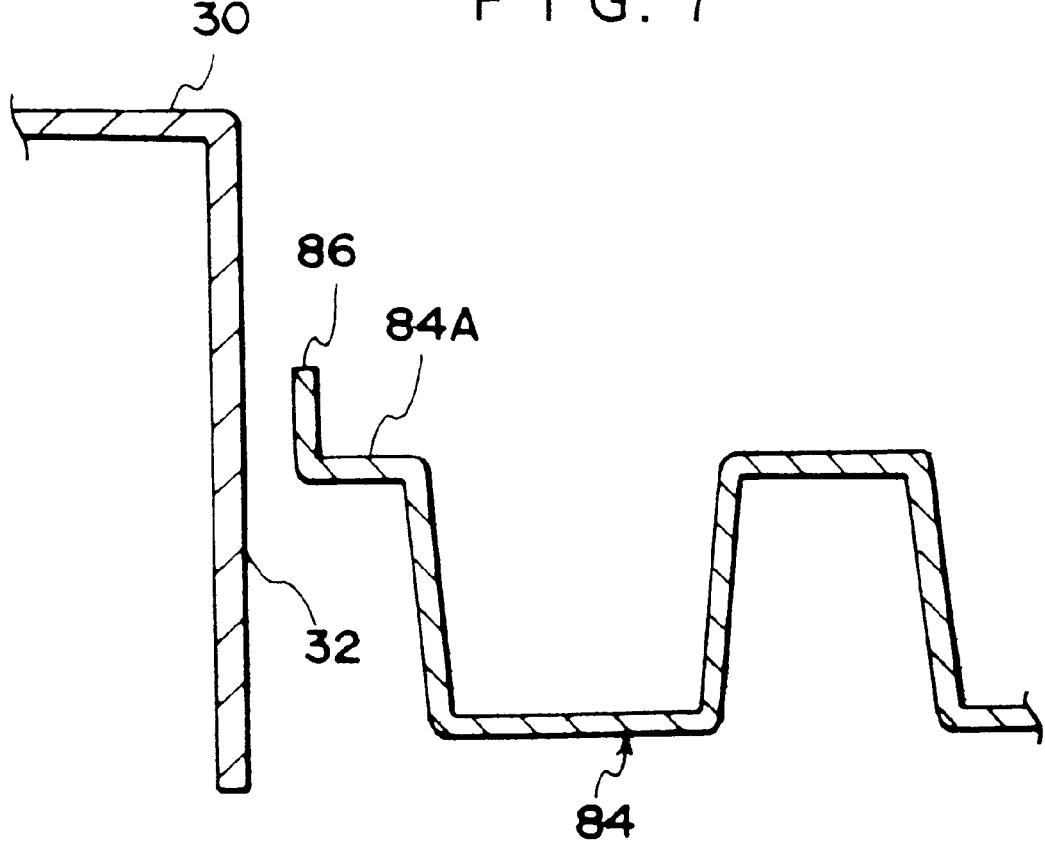
FIG. 7 is a cross-sectional view taken along line 7—7 of FIG. 6.

As illustrated in FIGS. 6 and 7, a regulating portion 86 is formed integrally with the front end side of a flange portion 84A which is positioned at the vehicle transverse direction outer side of a steering support 84. The regulating portion 86 extends substantially toward the vehicle transverse direction outer side, and the direction of inclination of the regulating portion 86 is the same as that of the regulating plate 76 described previously. More specifically, the feature of the present second embodiment is that the mounting portion 80A of the steering support 80 of the first embodiment has been made larger in the form of the regulating portion 86 so as to function as the regulating plate 76.

In accordance with this structure, the same operation and effects as those of the first embodiment are achieved, and in addition, the regulating plate 76 can be omitted. Therefore, the number of parts can be reduced. As a result, the construction can be simplified even more, and the amount of space required for the structure can be reduced. Moreover, because the welding work for mounting the regulating plate 76 can be eliminated, the only assembly required is the assembly of the steering support 84 to the instrument panel reinforcement 78 as in the conventional art.

A third embodiment of the present invention relating to the first through third aspects of the invention will be described hereinafter with reference to FIGS. 8 through 12. Structural portions which are the same as those of the previously-described first embodiment are denoted by the same reference numerals, and description thereof is omitted.

Figure 8:
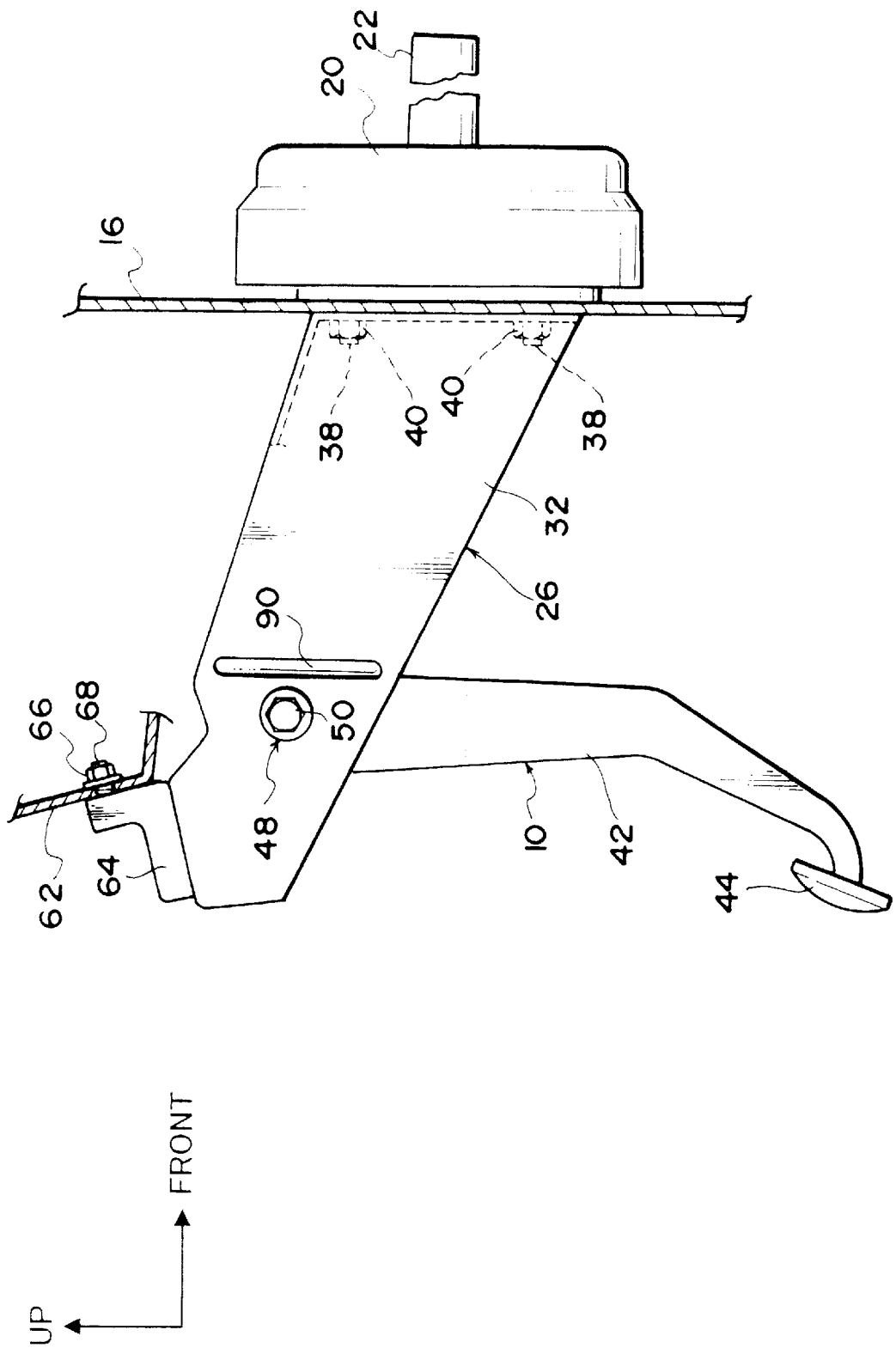
FIG. 8 is a side view illustrating main portions of a structure for controlling the displacement of a vehicle pedal relating to a third embodiment.

As illustrated in FIG. 8, the feature of the present third embodiment is that a bead 90, which is a concave portion which extends substantially in the vertical direction of the vehicle, is formed at a predetermined position of one of the side plate portions 32 of the pedal bracket 26 (i.e., the side plate portion 32 positioned at the vehicle outer side). In this way, the one side plate portion 32 is made to have low rigidity at the position at which the bead 90 is formed, and it is easy for stress to concentrate at this position. In the present third embodiment, the bead 90 is formed at one of the side plate portions 32 and in a vicinity of the rotating shaft portion 48. However, the position at which the bead 90 is formed may be selected appropriately as needed. Further, the structure for making a predetermined region of one of the side plate portions 32 have lower rigidity is not limited to the bead 90, and any of various other structures may be used. For example, it is possible to form the one side plate portion 32 such that only the position at which the bead 90 is formed is thin, or it is possible to form an elongated hole along the direction in which the bead 90 is formed, or the like.

Figure 9:
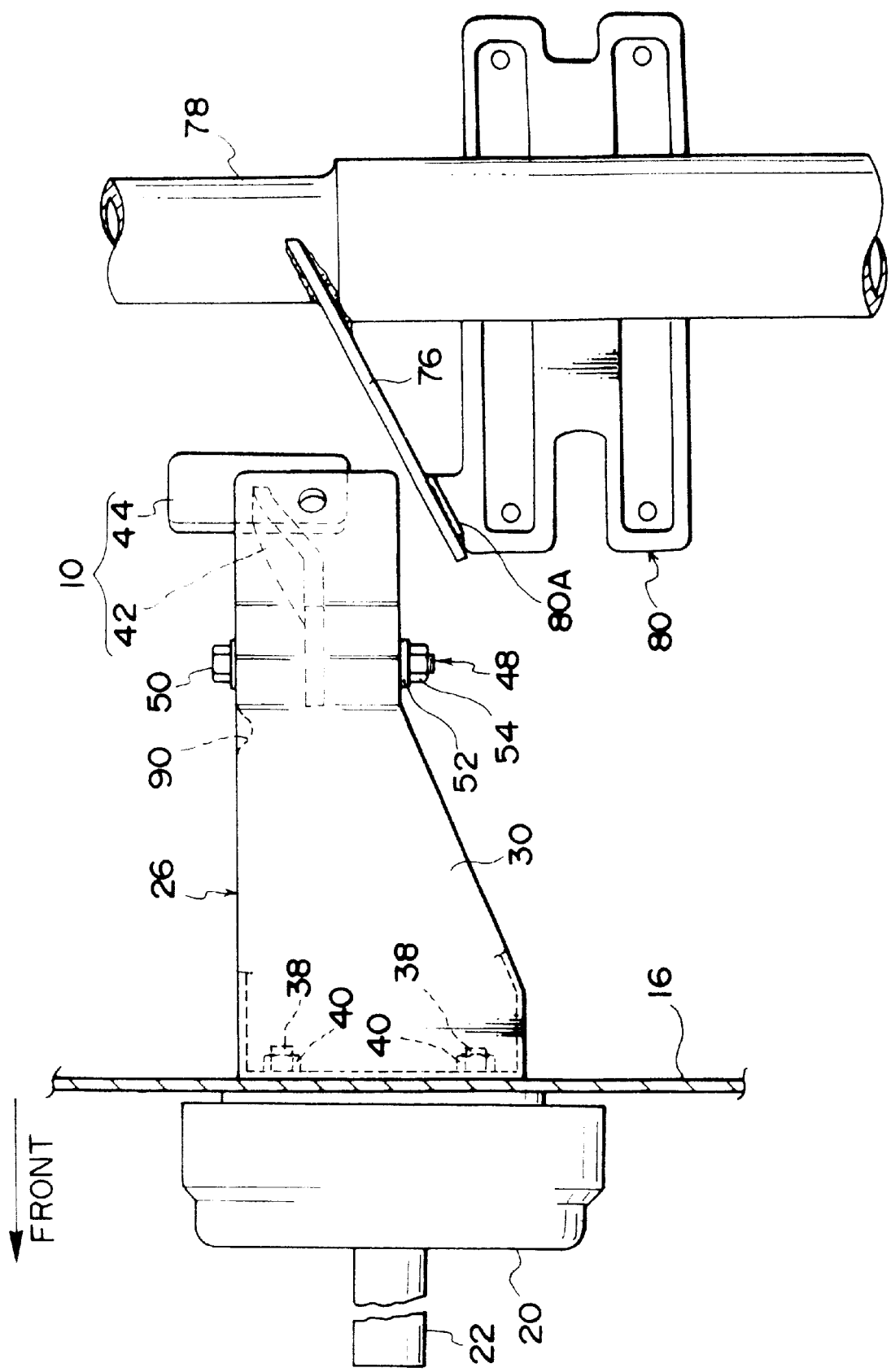
FIG. 9 is a plan view illustrating a state before external force of a predetermined value or greater is applied from the front of the vehicle in the third embodiment.
Figure 10:
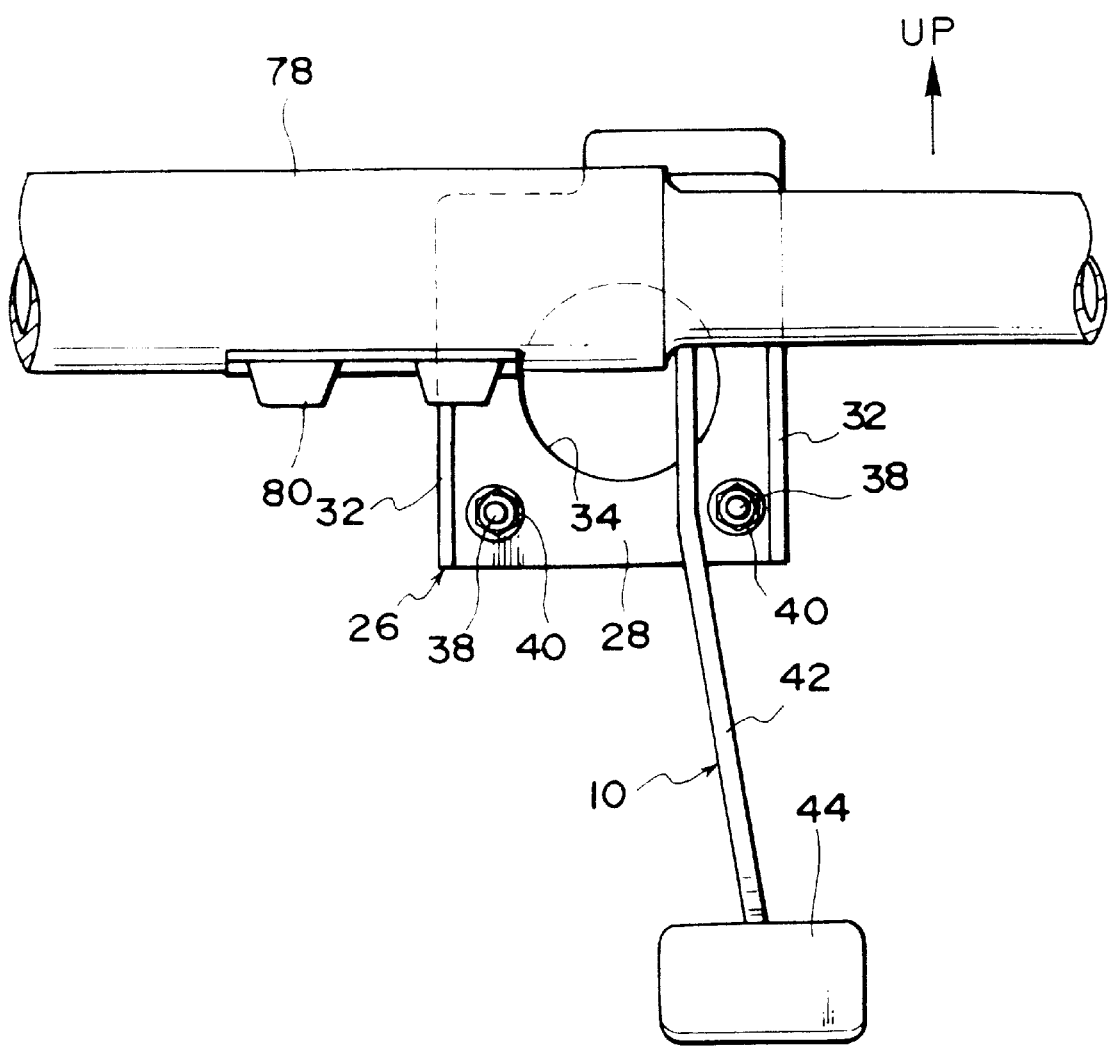
FIG. 10 is a rear view of FIG. 9.
Figure 11:
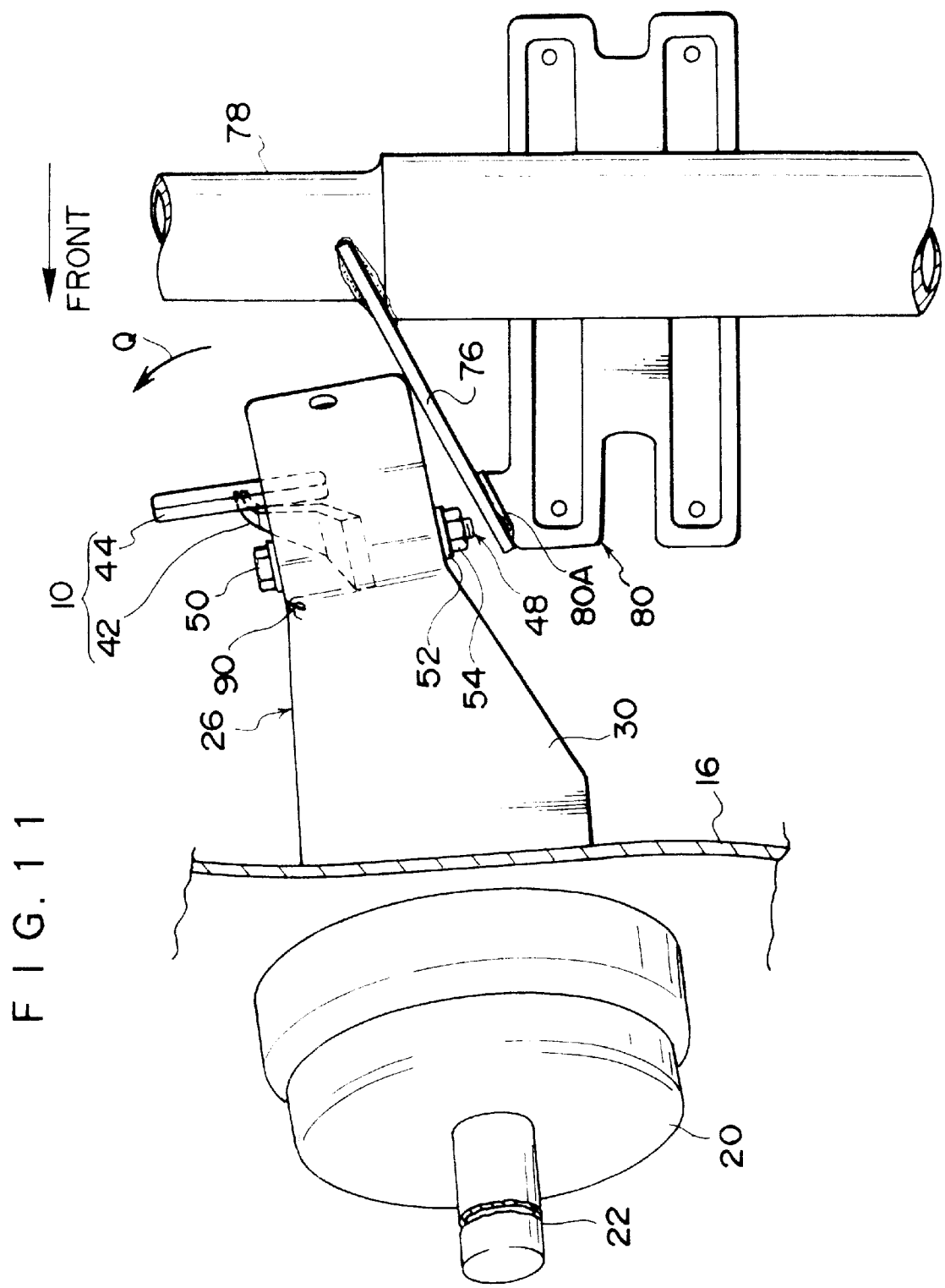
FIG. 11 is a plan view illustrating a state after external force of a predetermined value or greater is applied from the front of the vehicle in the third embodiment.
Figure 12:
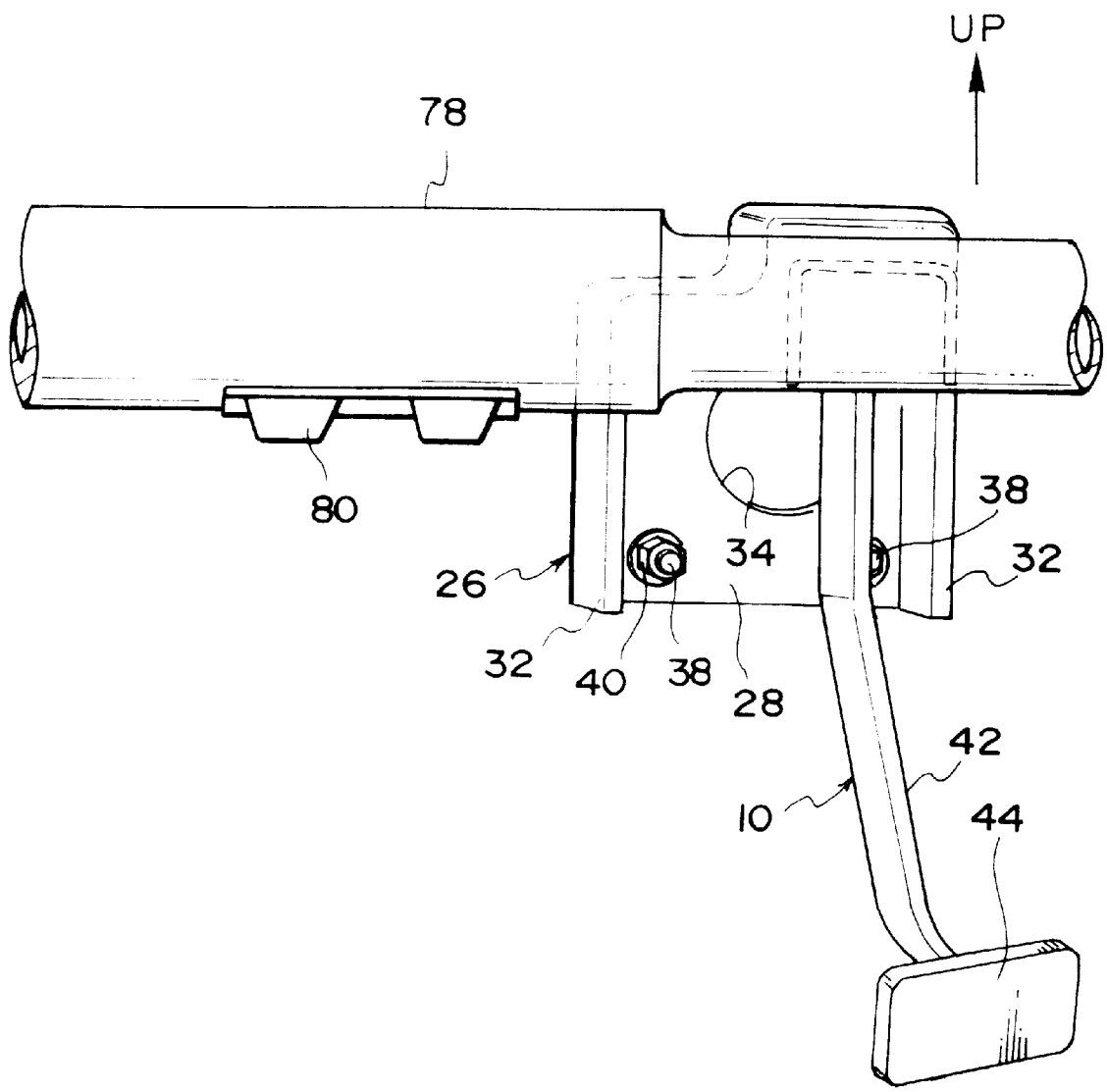
FIG. 12 is a rear view of FIG. 11.

In accordance with the above-described structure, the state illustrated by the plan view in FIG. 9 and the rear view in FIG. 10 is the initial state of the pedal bracket 26. In this state, the rear end portion of the other side plate portion 32 of the pedal bracket 26 is separated from the regulating plate 76.

In this state, when an external force of a predetermined value or greater is applied from the front of the vehicle, in the same way as in the previously-described first embodiment, the rear end portion of the top plate portion 30 of the pedal bracket 26 separates from the lower end portion 64B of the mounting bracket 64. Rotational force F around the base plate portion 28 and substantially toward the front of the vehicle is applied to the pedal bracket 26, and displacement force P toward the side is applied to the rear end side of the pedal bracket 26.

Here, in the present third embodiment, the bead 90, which extends substantially in the vertical direction of the vehicle, is formed at a predetermined position of the side plate portion 32 which is positioned at the outer side of the vehicle, such that the rigidity of the side plate portion 32 is decreased. Therefore, when the rear end portion of the other side plate portion 32 of the pedal bracket 26 slides along the regulating plate 76, as illustrated in the plan view of FIG. 11 and the rear view of FIG. 12, the one side plate portion 32 bends toward the outer side of the vehicle at the position at which the bead 90 is formed. As a result, a rotational force Q (see FIG. 11) around the position at which the bead 90 is formed and in the counterclockwise direction as seen in plan view is applied to the vicinity of the rear end of the pedal bracket 26. Accordingly, the amount of displacement toward the substantial vehicle transverse direction outer side at the vicinity of the rear end of the pedal bracket 26 in particular increases. The pedal pad 44 can thereby be further displaced substantially toward the front of the vehicle and substantially toward the vehicle transverse direction outer side.

In the above-described embodiments, the present invention is applied to a suspended-type main brake pedal. However, the object to which the present invention is to be applied is not limited to a suspended-type main brake pedal, and may be applied to a suspended-type clutch pedal or a suspended-type parking brake pedal or the like. This applies as well to the fourth embodiment which will be described later.

In the present third embodiment, the slit 74 of a predetermined configuration is formed in the lower end portion 64B of the mounting bracket 64 in order to separate the rear end portion of the top plate portion 30 of the pedal bracket 26 from the mounting bracket 64. However, the present invention is not limited to the same, and it is possible to utilize any of various structures. For example, the rear end portion of the pedal bracket 26 and the lower end portion 64B of the mounting bracket 64 may be joined by a shear pin such that, due to input of a load of a predetermined value or greater, the rear end portion of the pedal bracket 26 shears from the lower end portion 64B of the mounting bracket 64.

In the present third embodiment, for example, the substantially V-shaped slit 74 is formed in the lower end portion 64B of the mounting bracket 64. However, instead of the slit 74, a keyhole-shaped opening portion, which has a rear end side opening width greater than the front end side opening width thereof and greater than the diameter of the head portion of the fixing bolt 70, may be formed in the lower end portion 64B of the mounting bracket 64. Alternatively, an opening portion, which has a front end side opening width greater than the rear end side opening width thereof, may be formed in the top plate portion 30 of the pedal bracket 26.

In the above-described embodiments, the regulating plate 76 and the regulating portion 80, which correspond to the regulating means, are inclined substantially toward the vehicle transverse direction outer side. However, the present invention is not limited to the same, and any structure which can regulate the displacement of the rear end portion 30A of the pedal bracket 26 in the substantially transverse direction of the vehicle may be used as the regulating means of the present invention. For example, regulating plates 76 or the like may be provided at the left and right sides of the rear end portion 30A of the pedal bracket 26 such that the rear end portion 30A is not displaced in the substantially transverse direction of the vehicle.

A fourth embodiment of the present invention relating to the first through fourth aspects of the invention will be described hereinafter with reference to FIGS. 13 through 17. Structural portions which are the same as those of the previously-described first embodiment are denoted by the same reference numerals, and description thereof is omitted.

Figure 13:
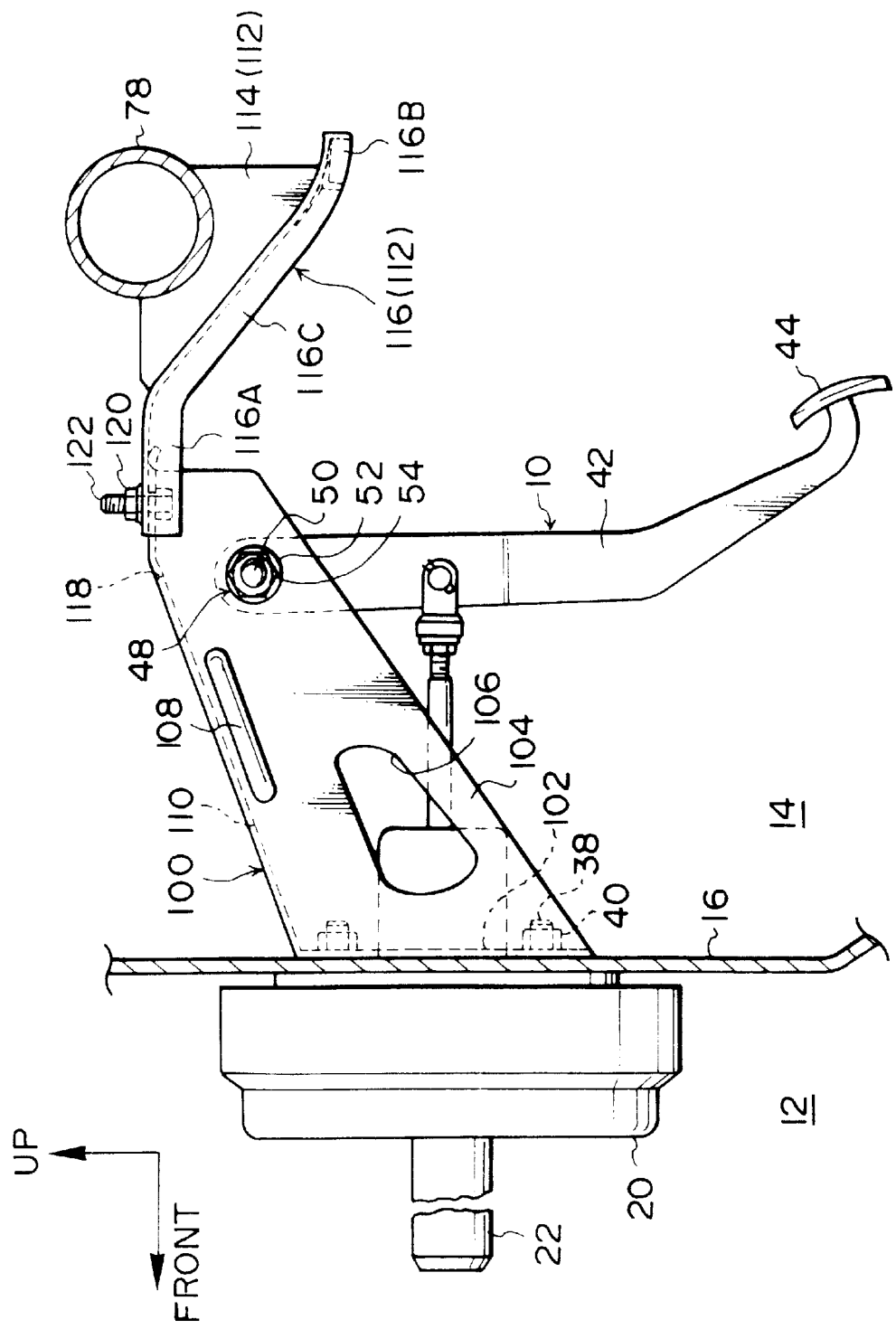
FIG. 13 is a side view illustrating main portions of a structure for controlling the displacement of a vehicle pedal relating to a fourth embodiment.

As illustrated in FIG. 13, the front end side of a pedal bracket 100 having a substantially U-shaped cross-section (i.e., a base plate portion 102) is fixed to the dash panel 16 by the nuts 40 being screwed with the stud bolts 38 which project from the brake booster 20 in the same way as in the previously-described embodiments. An opening 106 for lowering the rigidity in the longitudinal direction is provided in the vicinity of the vehicle front side portion of each of a pair of side plate portions 104 of the pedal bracket 100. Further, a bead 108 for locally increasing rigidity in the vehicle longitudinal direction is formed in the upper edge of each side plate portion 104.

The rear end side of the pedal bracket 100 (more specifically, the rear end side of the top plate portion 110) is fixed to a slide guide 112 which is mounted to the instrument panel reinforcement 78. More specifically, the slide guide 112 is formed by a base portion 114 and a guide rail 116. The base portion 114 has a substantially U-shaped cross-section and is fixed to a predetermined region of the instrument panel reinforcement 78 by welding or the like. The guide rail 116 has a substantially U-shaped cross-section and is fixed to the lower end surface of the base portion 114.

The height of a front end portion 116A of the guide rail 116 is set to be the same as the height of the center of the instrument panel reinforcement 78. The height of a rear end portion 116B of the guide rail 116 is set to a predetermined height which is below the instrument panel reinforcement 78. An intermediate portion 116C of the guide rail 116 is sloped downwardly along a direction toward the rear of the vehicle at a predetermined slope which joins the front end portion 116A and the rear end portion 116B when viewed from the side. Further, the front end portion 116A of the guide rail 116 is disposed substantially along the longitudinal direction of the vehicle. The intermediate portion 116C is curved, and the rear end portion 116B is directed substantially toward the vehicle transverse direction outer side (see FIGS. 15 and 16).

Figure 16:
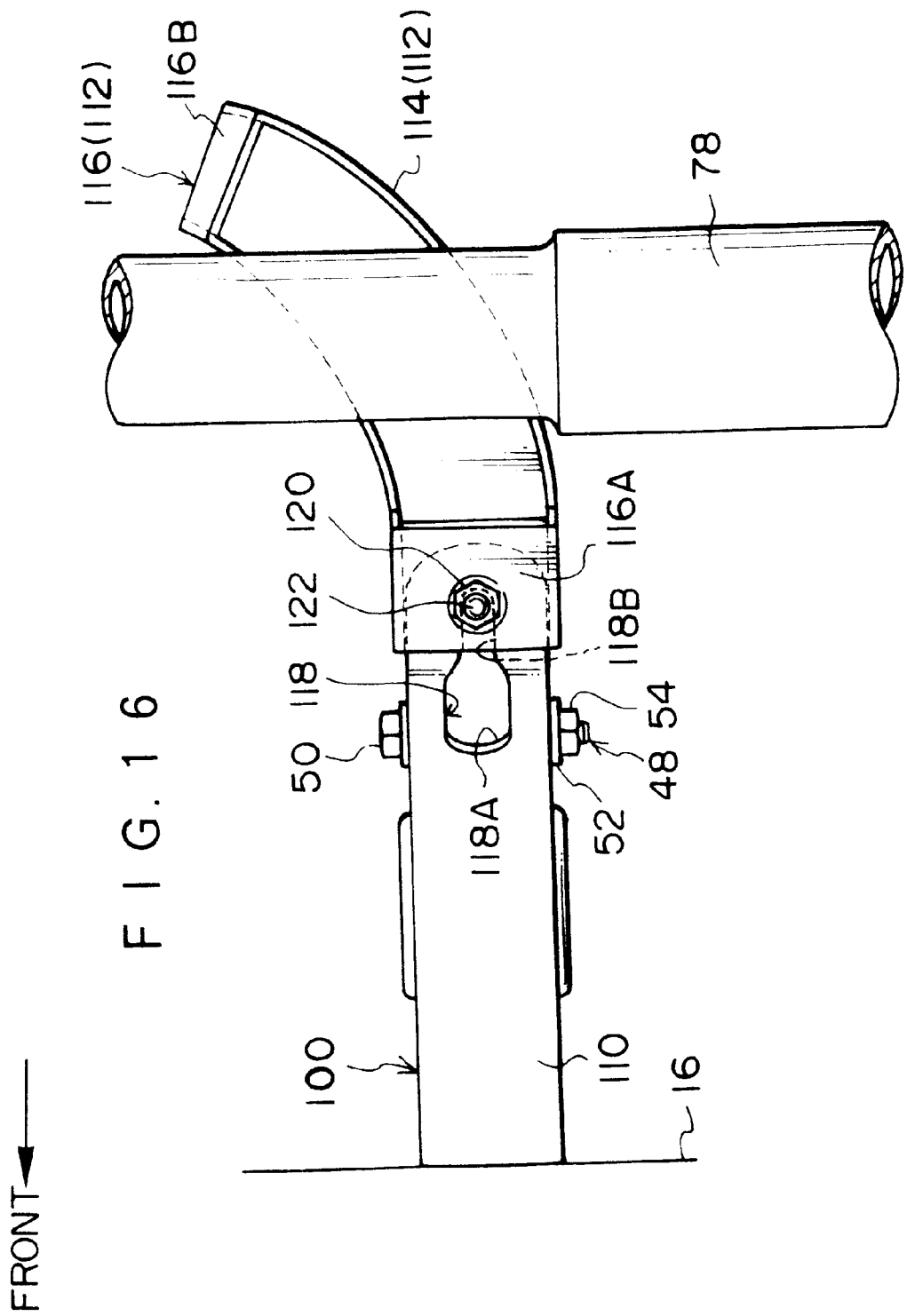
FIG. 16 is a plan view illustrating main portions of the structure for controlling the displacement of a vehicle pedal illustrated in FIG. 13.
Figure 17:
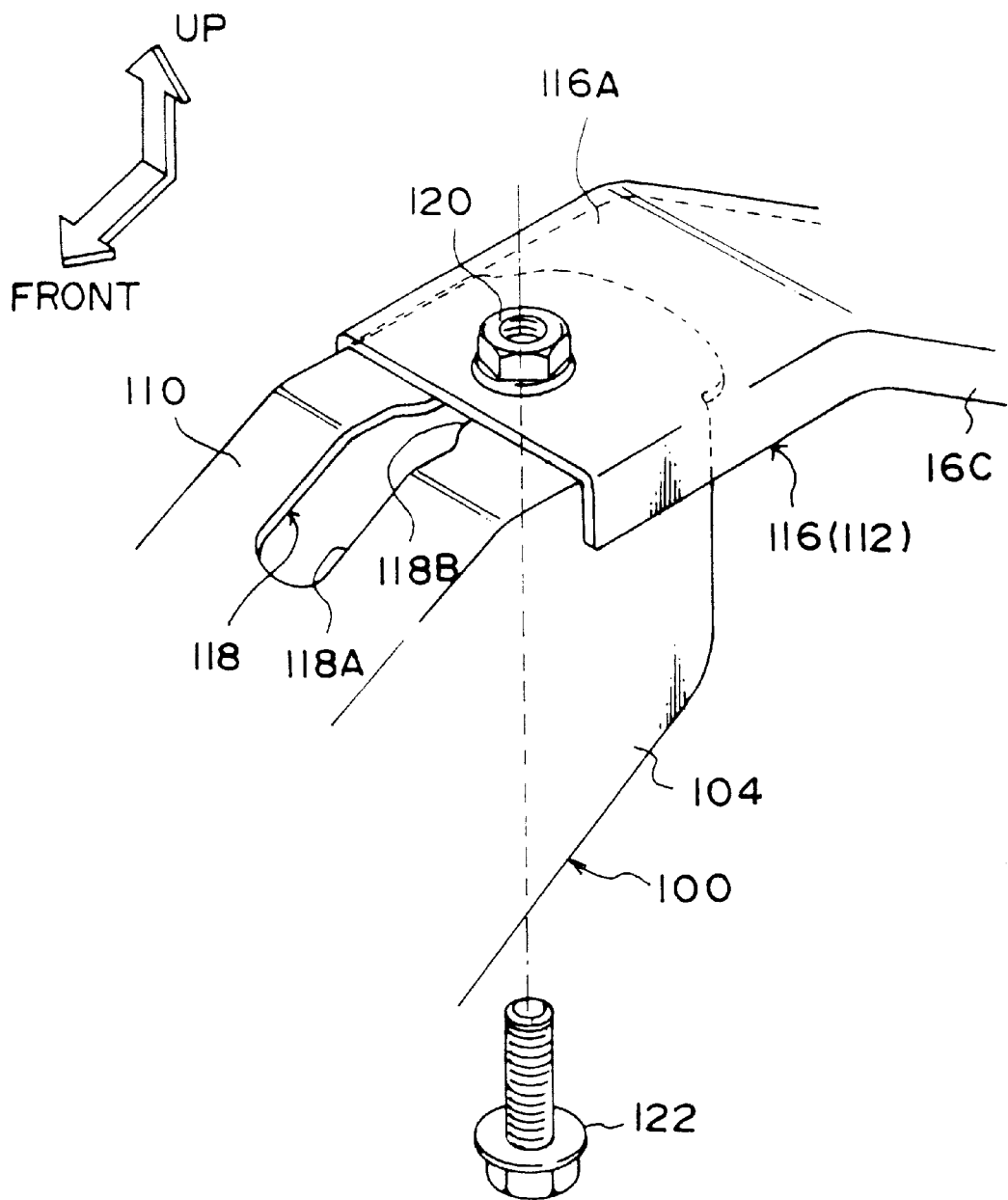
FIG. 17 is an enlarged perspective view of a separating structure of the structure for controlling the displacement of a vehicle pedal illustrated in FIG. 13.

As illustrated in FIGS. 16 and 17, the rear end side of the pedal bracket 100 is accommodated at the inner side of the front end portion 116A of the guide rail 116 in a state in which a portion of the guide rail 116 is superposed on a portion of the pedal bracket 100. A slit 118 i s pr ovided in the rear end side of the top plate portion 110 of the pedal bracket 100. The slit 118 is formed by a wide portion 118A and a narrow port ion 118B, and the longitudinal direction of the slit 118 runs along the longitudinal direction of the pedal bracket 100. A bolt through-hole (unillustrated) corresponding to the slit 118 is formed in a predetermined position of the front en d portion 116A of the guide rail 116, and a weld nut 120 is fixed to the predetermined position of the front end portion 116A of the guide rail 116 coaxially with the bolt through-hole. A fixing bolt 122 is inserted through the narrow portion 118B of the slit 118 from the bottom side of the top plate portion 110 and is screwed with the weld nut 120. The diameter of the shaft portion of the fixing bolt 122 is set to be slightly smaller than the narrow portion 118B of the slit 118. The diameter of the head portion of the fixing bolt 122 is set to be larger than the narrow portion 118B of the slit 118 and slightly smaller than the wide portion 118A of the slit 118.

Figure 14:
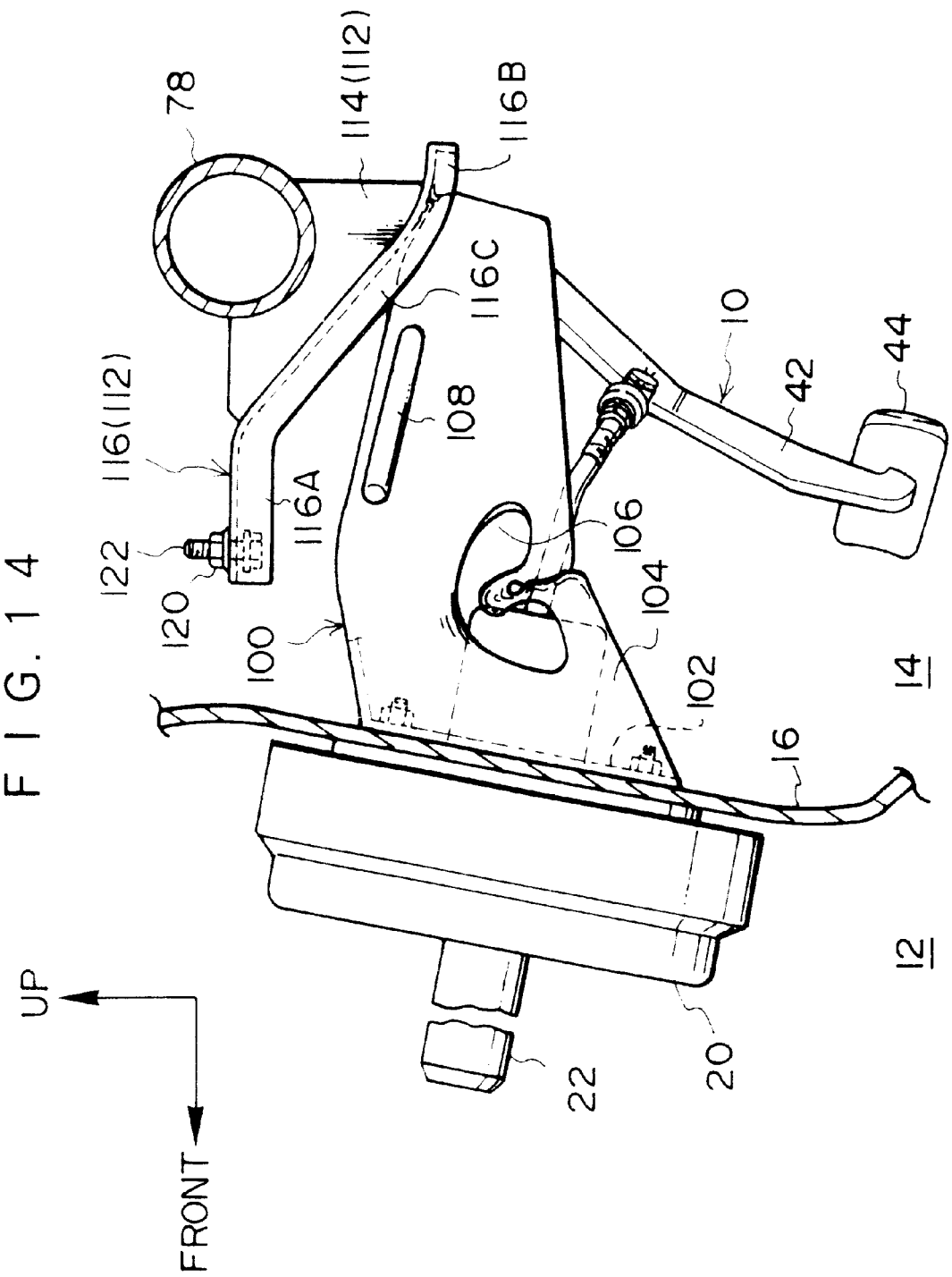
FIG. 14 is a side view illustrating a state after external force of a predetermined value or greater is applied from the front of the vehicle in the fourth embodiment.
Figure 15:
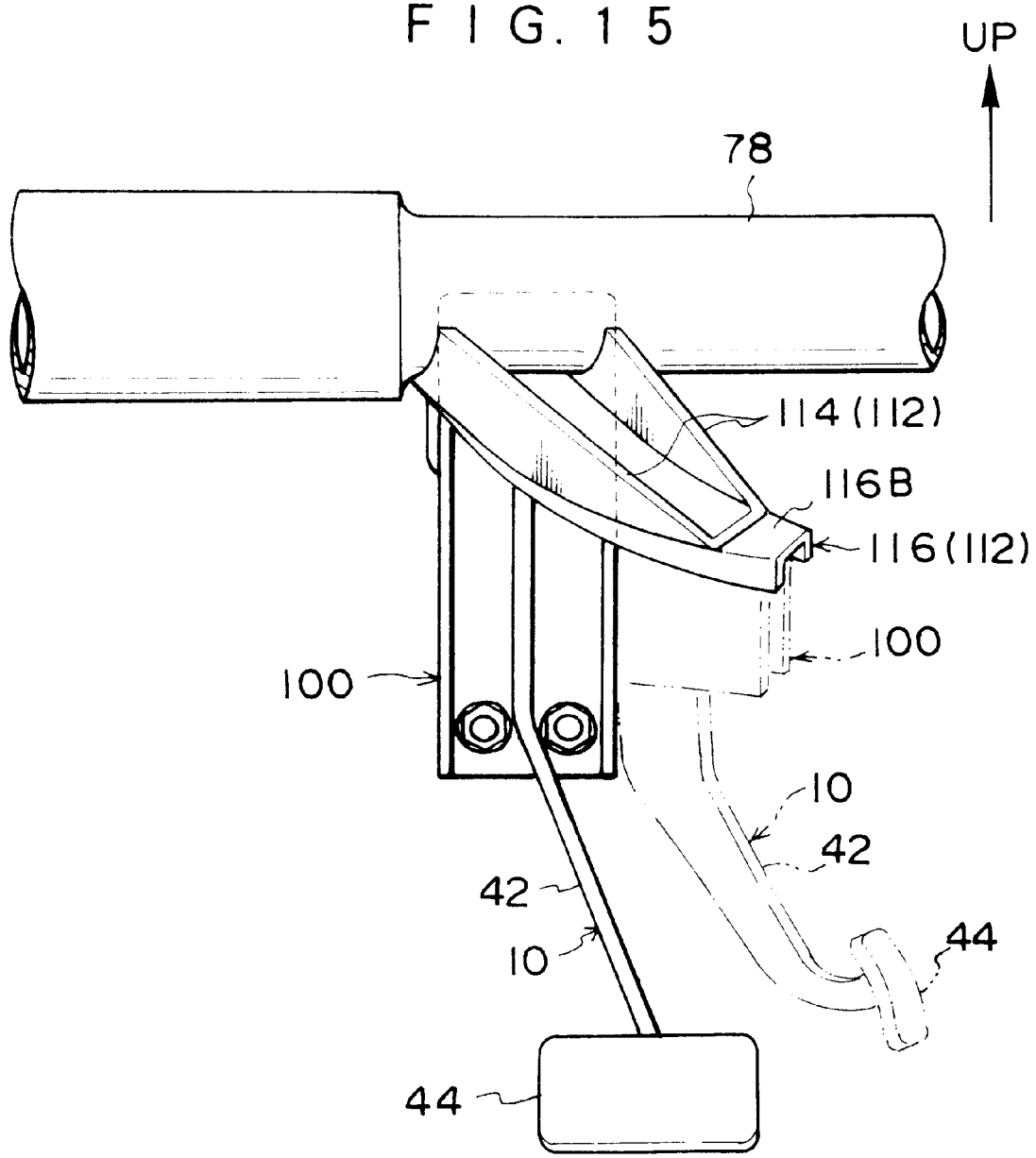
FIG. 15 is a rear view illustrating main portions of the structure for controlling the displacement of a vehicle pedal illustrated in FIG. 13.

In accordance with the above-described structure, the state illustrated in FIG. 13 is the initial state of the pedal bracket 100. In this state, when external force of a predetermined value or greater is applied from the front of the vehicle, as illustrated in FIG. 14, the dash panel 16 is displaced rearwardly substantially toward the rear of the vehicle. In this case, because the pedal bracket 100 also begins to be displaced rearwardly, the shaft portion of the fixing bolt 122 moves relatively from the narrow portion 118B of the slit 118 into the wide portion 118A of the slit 118. As a result, the joined state of the top plate portion 110 of the pedal bracket 100 and the front end portion 116A of the guide rail 116 is canceled, and the rear end side of the pedal bracket 100 separates from the front end portion 116A of the guide rail 116. In this way, the rear end side of the pedal bracket 100 slides while being guided successively by the respective wall surfaces of the front end portion 116A, the intermediate portion 116C and the rear end portion 116B of the guide rail 116. As a result, the rear end side of the pedal bracket 100 moves substantially toward the bottom of the vehicle while being rotated and displaced substantially toward the front of the vehicle (i.e., clockwise) while being rotated and displaced substantially toward the vehicle transverse direction outer side. Accordingly, the pedal pad 44 of the brake pedal 10, which is supported by the rotating shaft portion 48 at the pedal bracket 100, is also displaced substantially toward the front of the vehicle and substantially toward the vehicle transverse direction outer side. Therefore, in the present fourth embodiment as well, the knees of the driver, which move as the driver inertially moves at the time an external force of a predetermined value or greater is applied from the front of the vehicle, can be kept away from the steering column.

In the present fourth embodiment, the rear end side of the pedal bracket 100 after separation is slid substantially toward the vehicle transverse direction outer side by the guide rail 116 of the slide guide 112. Therefore, the rear end side of the pedal bracket 100 is reliably displaced substantially toward the vehicle transverse direction outer side along the guide path formed by the guide rail of the slide guide 112. More specifically, it is difficult for the displacement of the rear end side of the pedal bracket 100 to be offset substantially toward the vehicle transverse direction outer side. Accordingly, in the present fourth embodiment, the rear end side of the pedal bracket 100 and therefore the pedal pad 44 of the brake pedal 10 can be displaced in the desired direction.

In the present fourth embodiment, the rear end side of the pedal bracket 100 is displaced substantially toward the bottom of the vehicle and substantially toward the vehicle transverse direction outer side by the guide rail 116 of the slide guide 112. However, the structure described in the previously-described first embodiment in which the joining surface of the pedal bracket 26 and the mounting bracket 64 is inclined at a predetermined angle substantially toward the bottom of the vehicle substantially along a direction toward the rear of the vehicle may be used as the function for pushing the rear end side of the pedal bracket 100 substantially toward the bottom of the vehicle and rotating and displacing the rear end side of the pedal bracket 100 substantially toward the front of the vehicle. More specifically, the joining surface of the front end portion 116A of the guide rail 116 illustrated in FIG. 13 and the top plate portion 110 of the pedal bracket 100 may be inclined at a predetermined angle substantially toward the bottom of the vehicle substantially along a direction toward the rear side of the vehicle. In this case, it suffices to provide only a function in which guide rail displaces the rear end side of the pedal bracket 100 substantially toward the vehicle transverse direction outer side. An embodiment structured in this manner corresponds to an embodiment of the seventh aspect of the present invention.

A fifth embodiment of the present invention relating to the first, fifth and seventh aspects of the invention will be described hereinafter with reference to FIGS. 18 through 20. Structural portions which are the same as those of the previously-described embodiments are denoted by the same reference numerals, and description thereof is omitted.

Figure 18:
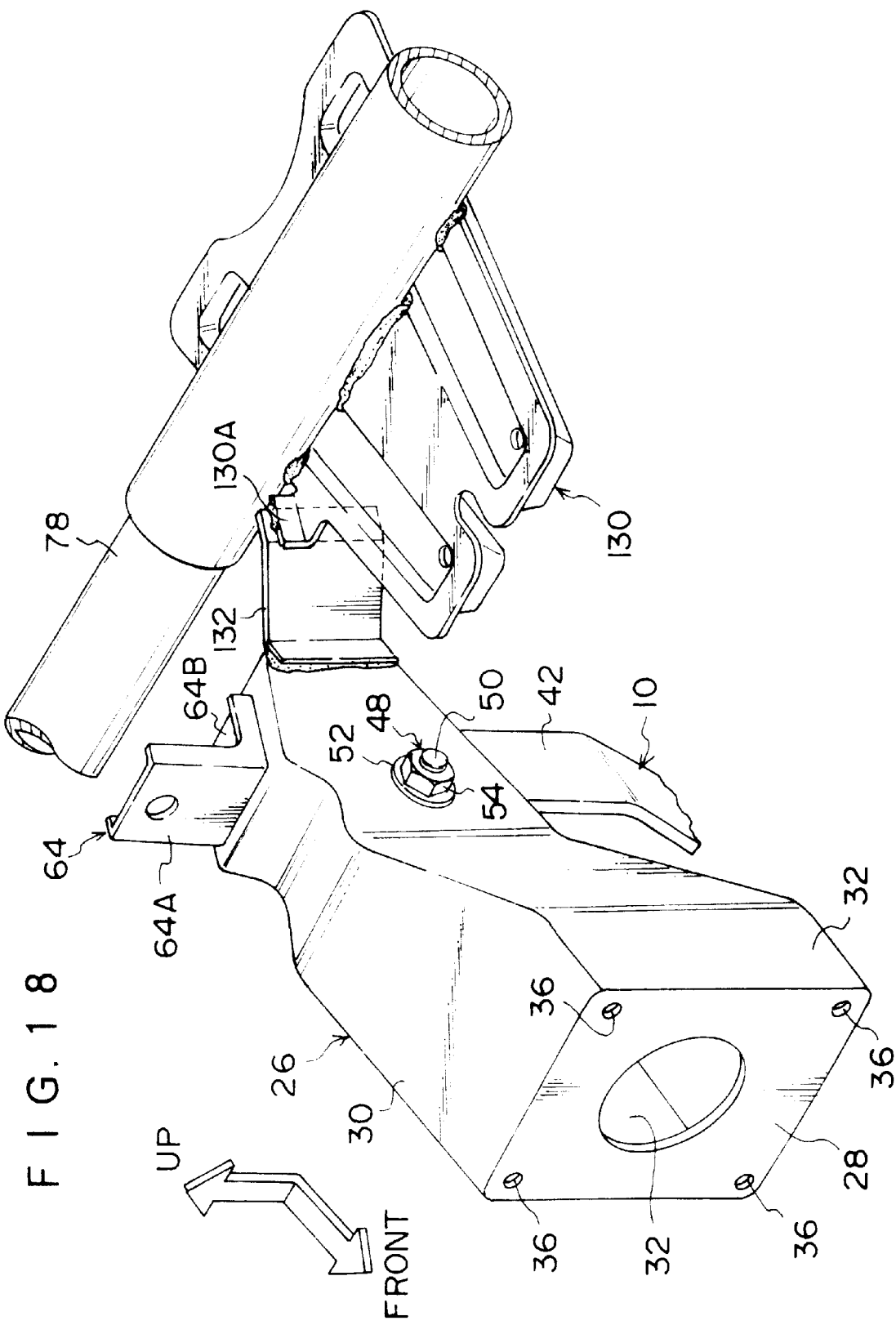
FIG. 18 is a perspective view illustrating main portions of a structure for controlling the displacement of a vehicle pedal relating to a fifth embodiment.
Figure 19:
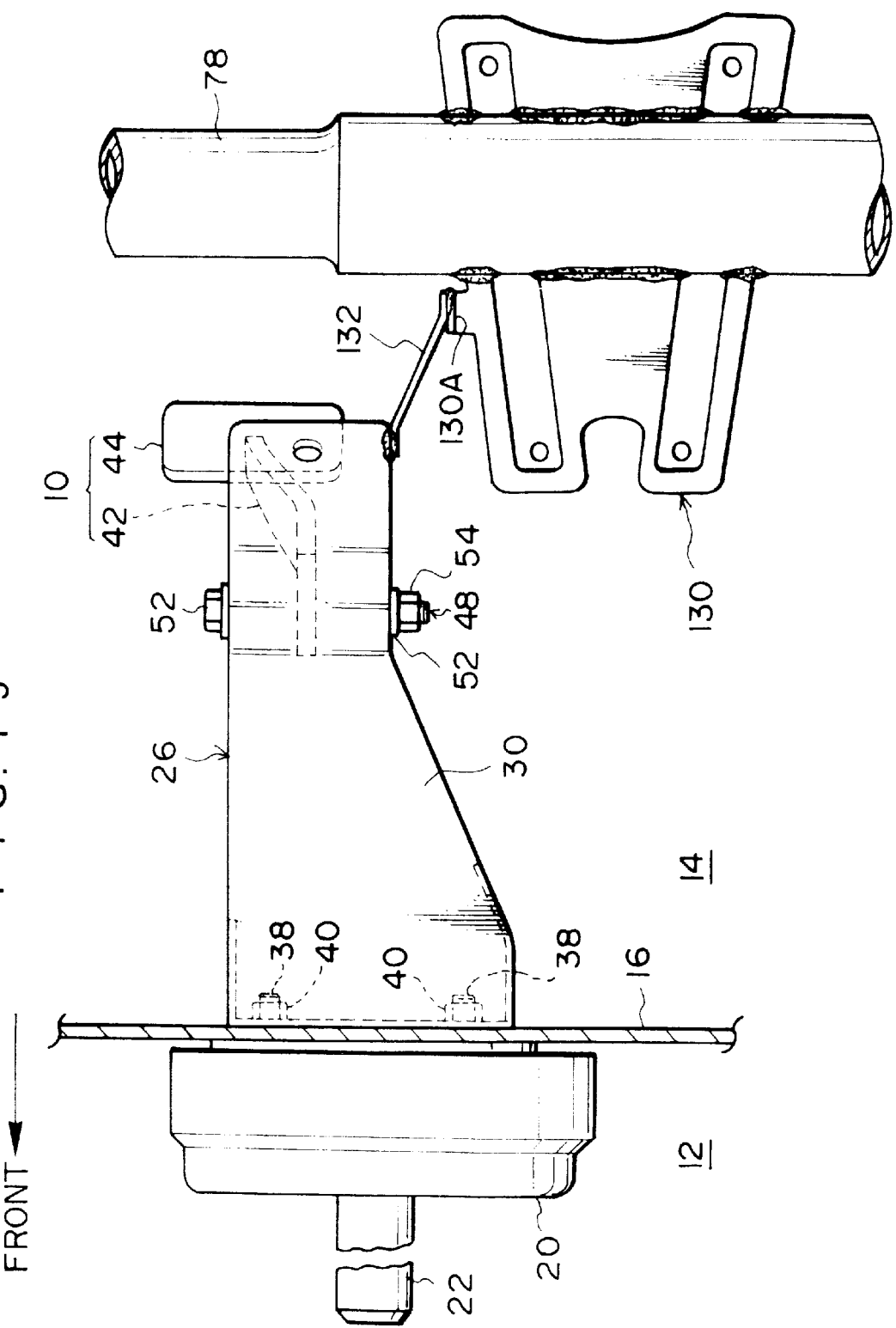
FIG. 19 is a plan view of FIG. 18.
Figure 20:
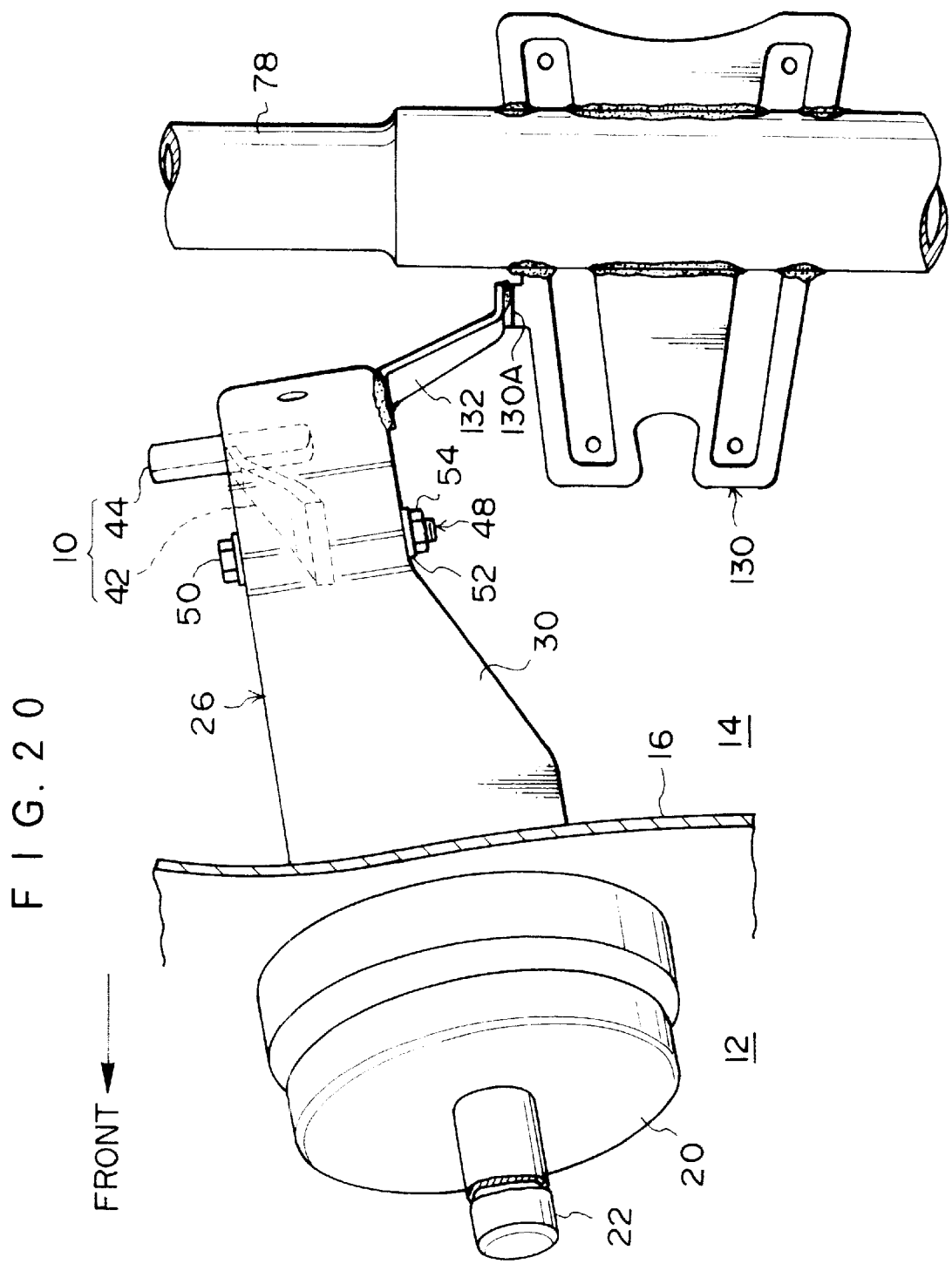
FIG. 20 is a plan view illustrating a state after an external force of a predetermined value or greater is applied from the front of the vehicle in the fifth embodiment.

As illustrated in FIGS. 18 and 19, an angle-shaped mounting portion 130A is formed integrally with the vehicle transverse direction side portion of a steering support 130 which is fixed to the instrument panel reinforcement 78. The rear end portion of a planar bending plate 132 is fixed by welding to the mounting portion 130A. The front end portion of the bending plate 132 is fixed by welding or the like to the rear end portion of the side plate portion 32 of the pedal bracket 26. Note that a fastening means such as rivets or the like may be used in place of welding. As described above, in a state in which the bending plate 132 spans between the rear end portion of the side plate portion 32 and the mounting portion 130A of the steering support 130, the bending plate 132 is disposed such that, as viewed from the side, a direction from the mounting portion 130A of the steering support 130 toward the front at an incline is the longitudinal direction of the bending plate 132. More specifically, the position of the bending plate 132 is determined such that, when relative displacement is generated between the mounting portion 130A of the steering support 130 and the rear end portion of the side plate portion 32, as the bending plate 132 rotates (swings), the rear end portion of the side plate portion 32 moves away from the mounting portion 130A and substantially toward the vehicle transverse direction outer side.

In accordance with the above-described structure, when an external force of a predetermined value or greater is applied from the front of the vehicle and the rear end side of the pedal bracket 26 separates from the mounting bracket 64, the pedal bracket 26 is rotated and displaced substantially toward the front of the vehicle due to the setting of the angle of inclination of the joining surface of the top plate portion 30 and the lower end portion 64B of the mounting bracket 64. Further, because the rear end side of the pedal bracket 26 and the steering support 130 are joined by the bending plate 132, when the pedal bracket 26 is rotated and displaced, the bending plate 132 rotates substantially toward the rear of the vehicle around the rear end portion thereof (i.e., the mounting portion 130A of the steering support 130). At this time, a slight torsion is generated at the bending plate 132. As a result, pushing force toward the vehicle transverse direction outer side is applied to the rear end side of the pedal bracket 26 due to the rotation operation of the front end portion of the bending plate 132. Accordingly, in the same way as in the previously-described embodiments, the pedal pad 44 of the brake pedal 10 can be displaced substantially toward the front of the vehicle and substantially toward the outer side in the transverse direction of the vehicle.

In the present fifth embodiment, due to the rotation operation of the bending plate 132, pushing force substantially toward the vehicle transverse direction outer side is applied to the rear end side of the pedal bracket 26, and the rear end side is displaced substantially toward the vehicle transverse direction outer side. Therefore, if the radius of gyration of the bending plate 132 (i.e., the longitudinal direction dimension thereof) is set small, the amount of displacement of the rear end side of the pedal bracket 26 substantially toward the vehicle transverse direction outer side can be made small. If the radius of gyration of the bending plate 132 is set large, the amount of displacement of the rear end side of the pedal bracket 26 substantially toward the vehicle transverse direction outer side can be made large. In accordance with the present embodiment, by adjusting the setting of the radius of gyration of the bending plate 132, the amount of displacement of the rear end side of the pedal bracket 26 substantially toward the vehicle transverse direction outer side can be adjusted arbitrarily.

In the present fifth embodiment, the bending plate 132 is disposed (rotated) substantially within the horizontal plane of the of the vehicle. However, the present invention is not limited to this structure. Any structure suffices provided that, when relative displacement is generated between the mounting portion 130A of the steering support 130 and the rear end portion of the side plate portion 32, pushing force substantially toward the vehicle transverse direction outer side is applied to the rear end portion of the side plate portion 32 and the rear end portion is made to separate from the mounting portion 130A.

A sixth embodiment of the present invention relating to the first and sixth aspects of the invention will be described hereinafter with reference to FIGS. 21 through 23. Structural portions which are the same as those of the previously-described embodiments are denoted by the same reference numerals, and description thereof is omitted.

Figure 21:
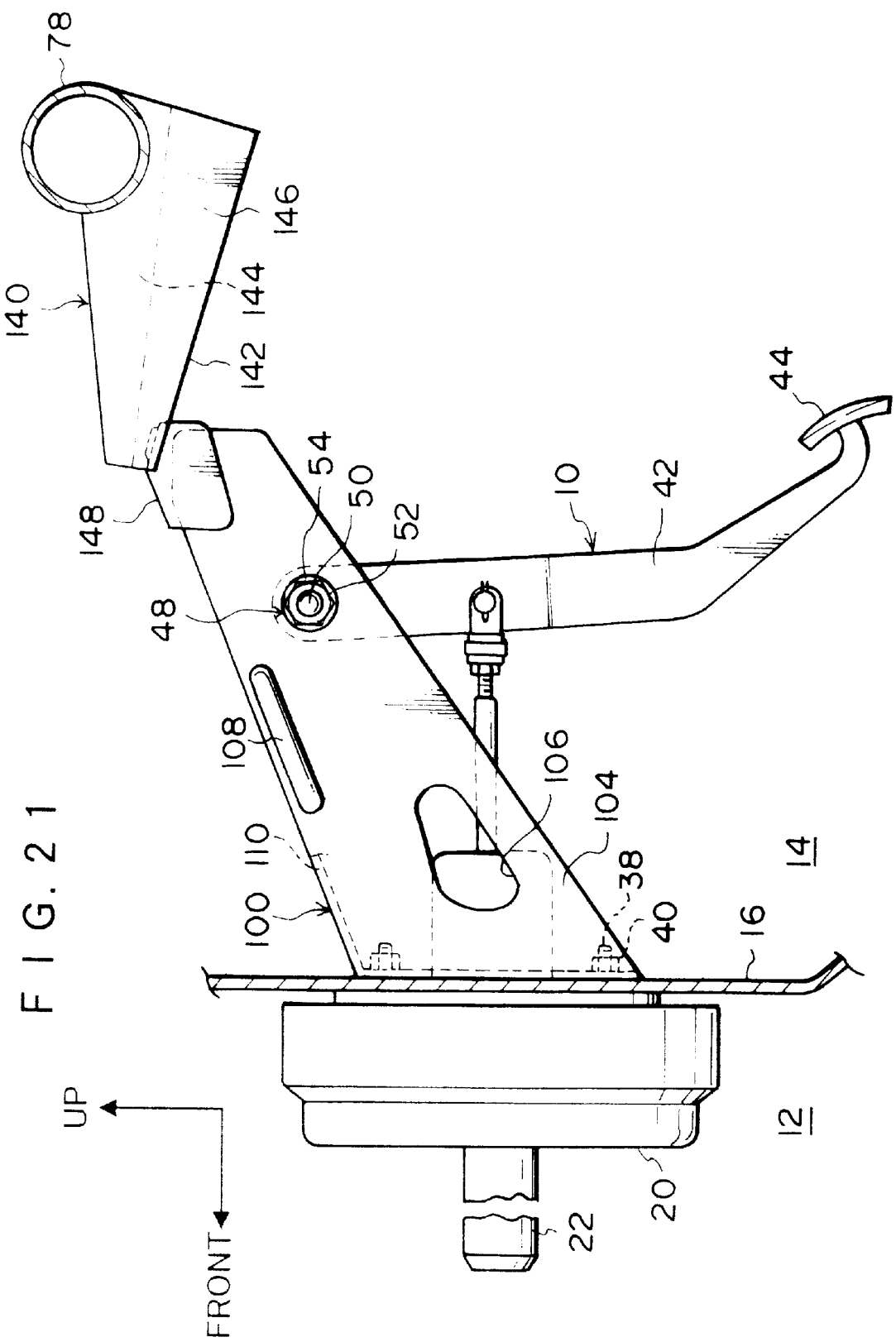
FIG. 21 is a side view illustrating main portions of a structure for controlling the displacement of a vehicle pedal relating to a sixth embodiment.
Figure 22:
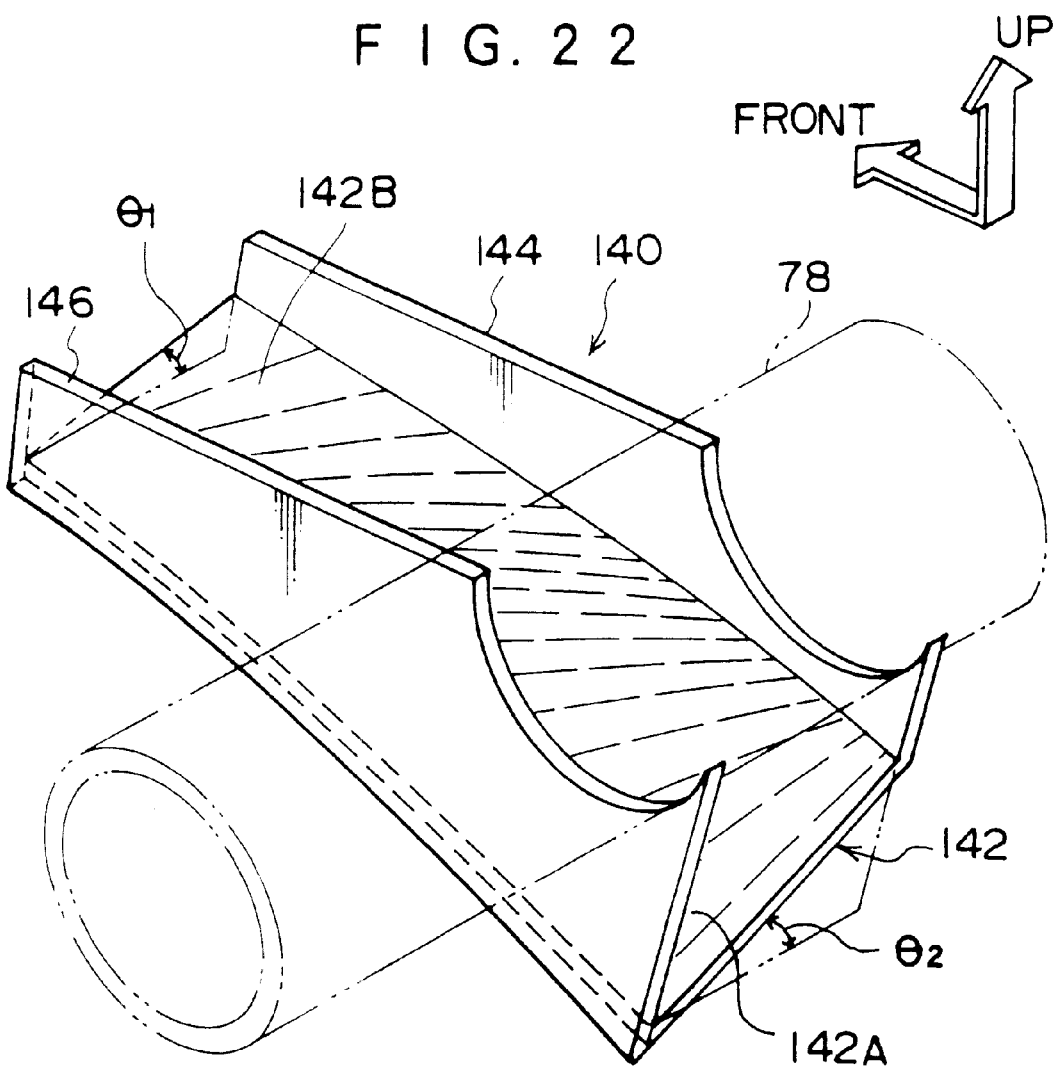
FIG. 22 is an enlarged perspective view of a slide guide illustrated in FIG. 21.
Figure 23:
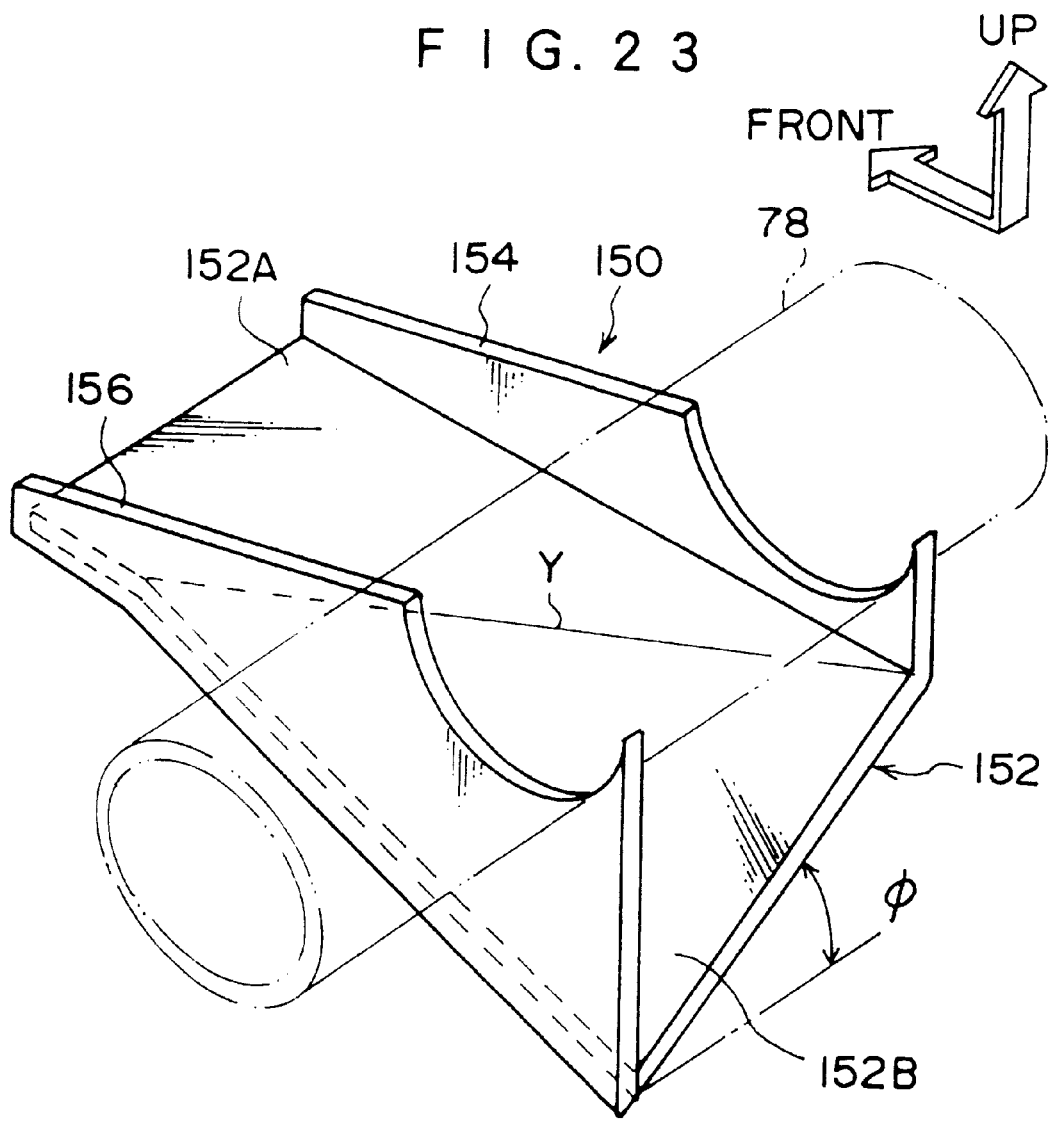
FIG. 23 is an enlarged perspective view of a slide guide which has a different structure than that of the slide guide illustrated in FIG. 22.
Figure 24:
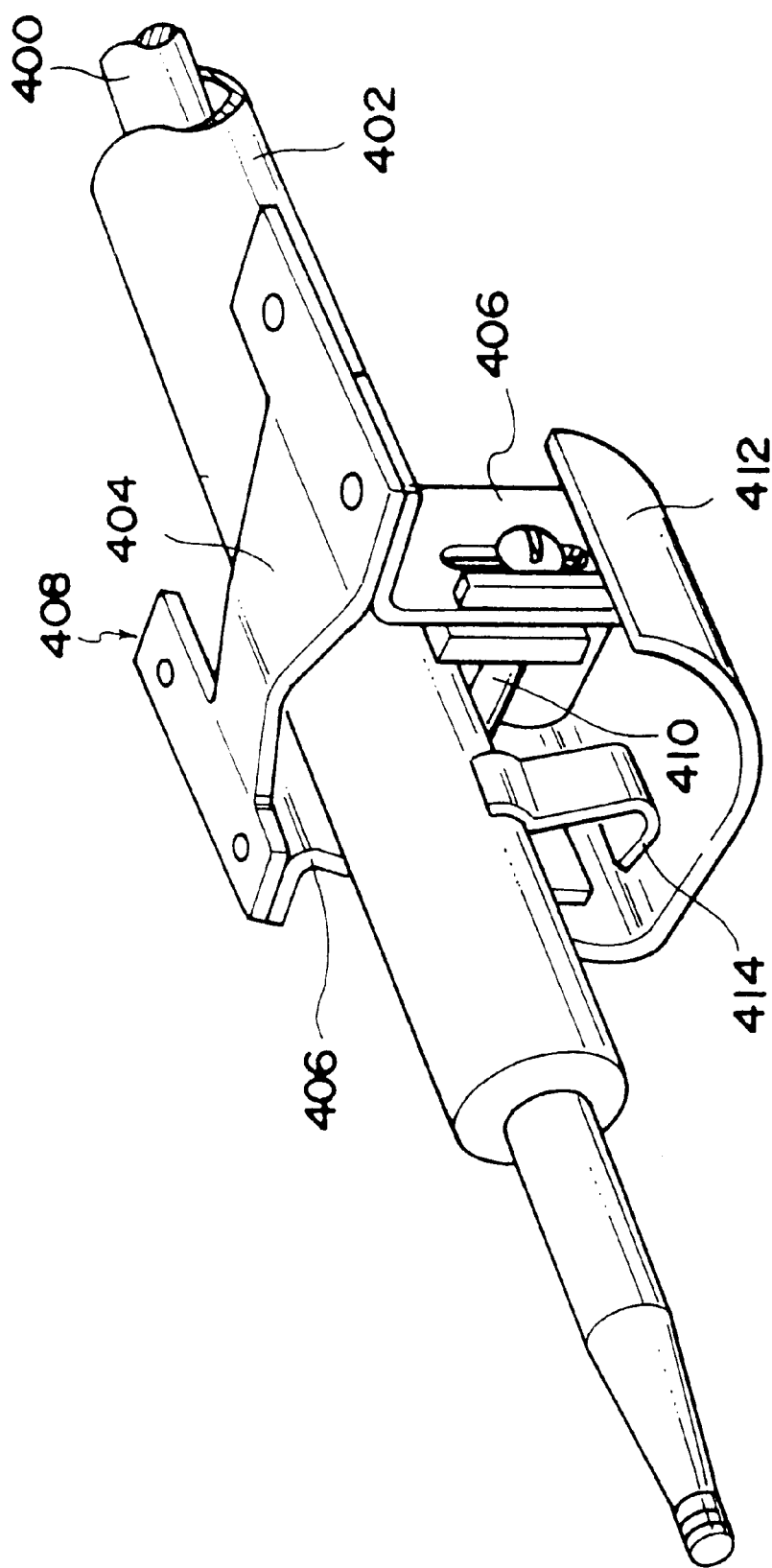
FIG. 24 is a perspective view illustrating a conventional structure.

As illustrated in FIGS. 21 and 22, the feature of the present sixth embodiment is that, by using the configuration of a slide guide 140 fixed to the instrument panel reinforcement 78, the rear end side of the pedal bracket 100 is displaced in the same way as in the previously-described embodiments.

More specifically, the slide guide 140 is formed by a bottom wall 142 and a pair of side walls 144, 146 which are welded to the vehicle transverse direction side portions of the bottom wall 142 and have respectively different heights. In the present sixth embodiment, the wall surface of the bottom wall 142 of the slide guide 140 is formed as a twisted surface. In FIG. 22, the twisting of the wall surface of the bottom wall 142 is illustrated by the plural thin lines drawn on the wall surface. In this way, in the present sixth embodiment, the angle of inclination $\theta_2$, with respect to the substantially transverse direction of the vehicle, of a wall surface of a rear portion 142A of the bottom wall 142 is set to be greater than the angle of inclination $\theta_1$, with respect to the substantially transverse direction of the vehicle, of a wall surface of a front portion 142B of the bottom wall 142.

A slide bracket 148 having a substantially U-shaped cross-section is fixed to the rear end side of the pedal bracket 100. The center of the top portion of the slide bracket 148 and the center of the front portion 142B of the bottom surface 142 of the slide guide 140 are joined together by spot welding. This joined state of the slide bracket 148 and the slide guide 140 is canceled by a shearing load of a predetermined value or greater being applied to the region of joining.

In accordance with the above-described structure, when an external force of a predetermined value or greater is applied from the front of the vehicle, shearing load is applied to the region at which the slide guide 140 and the slide bracket 148 of the pedal bracket 100 are joined. When the shearing load reaches a predetermined value or greater, the joined state of the slide bracket 148 and the slide guide 140 is canceled, and the slide bracket 148 separates from the front portion 142B at the bottom wall 142 of the slide guide 140. As a result, the slide bracket 148 slides along the wall surface of the bottom wall 142 of the slide guide 140.

Here, in the present sixth embodiment, the wall surface of the bottom wall 142 of the slide guide 140 is formed as a twisted surface. The angle of inclination $\theta_1$ of the wall surface of the front portion 142B of the bottom wall 142 is set to be smaller than the angle of inclination $\theta_1$ of the wall surface of the rear portion 142A of the bottom wall 142. Therefore, when the slide bracket 148, which is disposed at the rear end side of the pedal bracket 100, slides from the front portion 142B of the bottom wall 142 toward the rear portion 142A, due to the difference in the heights of the front portion 142B and the rear portion 142A, the slide bracket 148 is pushed substantially toward the bottom of the vehicle, and the pedal bracket 100 is rotated and displaced substantially toward the front of the vehicle (i.e., clockwise). Simultaneously, because the angle of inclination of the wall surface gradually increases from the front portion 142B toward the rear portion 142A, the slide bracket 148 receives a component of force substantially toward the vehicle transverse direction outer side and corresponding to the angle of inclination of the wall surface, so as to be displaced substantially toward the vehicle transverse direction outer side. Accordingly, in the same way as in the previously-described embodiments, the pedal pad 44 of the brake pedal 10 can be displaced substantially toward the front of the vehicle and substantially toward the vehicle transverse direction outer side.

In the present sixth embodiment, the wall surface of the bottom wall 142 of the slide guide 140 is structured as a twisted surface. The angle of inclination $\theta_2$, with respect to the substantially transverse direction of the vehicle, of the wall surface of the rear portion 142A of the bottom wall 142 is set to be greater than the angle of inclination $\theta_1$, with respect to the substantially transverse direction of the vehicle, of the wall surface of the front portion 142B of the bottom wall 142. Therefore, the construction can be simplified, and the amount of space required for the structure can be reduced.

In the structure illustrated in FIG. 22, the wall surface of the bottom wall 142 of the slide guide 140 is formed as a twisted surface. However, the structure illustrated in FIG. 23 as another embodiment may also be used. As illustrated in FIG. 23, in this embodiment, a slide guide 150 is similar to the previously-described slide guide 140 in that the slide guide 150 is formed by a bottom wall 152 and a pair of side walls 154, 156. However, the slide guide 150 differs from the slide guide 140 in that in the slide guide 150, the bottom wall 152 is bent along a bending line Y which is almost a diagonal line. In this way, the bottom wall 152 of the slide guide 150 is formed by a first guide portion 152A, which is positioned at the front side of the bending line Y, and a second guide portion 152B, which is positioned at the rear side of the bending line Y. Further, the angle of inclination $\phi$, with respect to the substantially transverse direction of the vehicle, of the wall surface of the second guide portion 152B is set to be greater than the angle of inclination, with respect to the substantially transverse direction of the vehicle, of the wall surface of the first guide portion 152A (which angle of inclination is, in the present embodiment, approximately 0 degrees, i.e., the first guide portion 152A is not inclined with respect to the substantially transverse direction of the vehicle). In this embodiment, because the bottom wall 152 of the slide guide 150 is bent along the bending line Y, the one side wall 154 is formed by bending processing, and there is no need for the one side wall 154 to be attached afterwards by welding.

In accordance with the above-described structure, the same operation and effects as those achieved by the slide guide 140 illustrated in FIG. 22 are obtained. More specifically, when the slide bracket 148 slides along the wall surface of the first guide portion 152A of the slide guide 150, the slide bracket 148 is not displaced substantially toward the vehicle transverse direction outer side. However, when the slide bracket 148 crosses over the bending line Y and slides along the wall surface of the second guide portion 152B, due to the difference in heights corresponding to the angle of inclination $\phi$, the slide bracket 148 is pushed down substantially toward the bottom of the vehicle, and the pedal bracket 100 is rotated and displaced substantially toward the front of the vehicle. Simultaneously, the slide bracket 148 receives a component of force substantially toward the vehicle transverse direction outer side and corresponding to the angle of inclination $\phi$, and is displaced substantially toward the vehicle transverse direction outer side. Accordingly, in this embodiment, the same operation and effects are achieved as those in a case in which the slide guide 140 illustrated in FIG. 22 is used.

In accordance with this embodiment, because the bottom wall 152 of the slide guide 150 is bent along the bending line Y, the construction can be simplified even more than in the case in which the slide guide 140 of FIG. 22 is used. Further, as the number of welding processes can be decreased, the cost of the structure can be decreased.

In the present sixth embodiment, a structure is employed in which the rear end side of the pedal bracket 100 is displaced substantially toward the bottom of the vehicle and substantially toward the vehicle transverse direction outer side, by utilizing the configurations of the slide guides 140, 150. However, the structure used in the previously-described first embodiment for pushing the rear end side of the pedal bracket down substantially toward the bottom of the vehicle and rotating and displacing the rear end side substantially toward the front of the vehicle may be used in the sixth embodiment. The above-described sixth embodiment corresponds to the seventh aspect of the present invention.

In the above-described embodiments, the mounting bracket 64 and the slide guides 112, 140, 150 are used as the second vehicle structural member to which the rear end portion of the pedal bracket 26, 100 is connected. However, the present invention is not limited to the same, and the instrument panel reinforcement 78 may be used as the second vehicle structural member.

What is claimed is:

1. A structure comprising:
   a vehicle pedal including a rotating shaft portion and a stepping surface;
   a pedal bracket supporting the rotating shaft portion of the vehicle pedal, a front end portion of said pedal bracket connected to a first vehicle structural member and a rear end portion of said pedal bracket connected to a second vehicle structural member which is disposed at a vehicle rear side of the first vehicle structural member;
   separating means for disconnecting the connected rear end portion of said pedal bracket from the second vehicle structural member when an external force of a predetermined value or greater is applied to a front portion of the vehicle, which causes the first vehicle structural member to deform in a direction toward a rear portion of the vehicle such that said pedal bracket is displaced toward the rear of the vehicle, so as to separate and disconnect the rear end portion of said pedal bracket and the second vehicle structural member; and
   displacement controlling means, disposed at the rear end portion of said pedal bracket, for controlling displacement of the stepping surface of the vehicle pedal by regulating displacement, in a vehicle transverse direction, of the rear end portion of said pedal bracket when the rear end portion has been separated from the second vehicle structural member.

2. A structure for controlling displacement of a vehicle pedal according to claim 1, wherein said displacement controlling means is a regulating means which is inclined outwardly in a vehicle transverse direction with respect to a direction toward the rear of the vehicle, and which is positioned to interfere with movement of the rear end portion of said pedal bracket when the rear end portion has been separated from the second vehicle structural member.

3. A structure for controlling displacement of a vehicle pedal according to claim 2, wherein joined surfaces of the rear end portion of said pedal bracket and the second vehicle structural member are inclined in a direction toward a bottom of the vehicle with respect to a direction toward the rear of the vehicle.

4. A structure for controlling displacement of a vehicle pedal according to claim 1, wherein joined surfaces of the rear end portion of said pedal bracket and the second vehicle structural member are inclined toward a bottom of the vehicle with respect to a direction toward the rear of the vehicle.

5. A structure for controlling displacement of a vehicle pedal according to claim 1, wherein said displacement controlling means is a guide means which guides the rear end portion of said pedal bracket, when the rear end portion has been separated from the second vehicle structural member, outwardly in a vehicle transverse direction with respect to a direction toward the rear of the vehicle.

6. A structure for controlling displacement of a vehicle pedal according to claim 5, wherein joined surfaces of the rear end portion of said pedal bracket and the second vehicle structural member are inclined in a direction toward a bottom of the vehicle with respect to a direction toward the rear of the vehicle.

7. A structure for controlling displacement of a vehicle pedal according to claim 1, wherein said displacement controlling means is a pushing means which bridges the rear end portion of said pedal bracket and a vehicle body, said pushing means applying pushing force in a direction toward a substantially vehicle transverse direction outer side to the rear end side of said pedal bracket by swinging around a region at which said pushing means is joined to the vehicle body.

8. A structure for controlling displacement of a vehicle pedal according to claim 7, wherein joined surfaces of the rear end portion of said pedal bracket and the second vehicle structural member are inclined substantially toward a bottom of the vehicle substantially along a direction toward the rear of the vehicle.

9. A structure for controlling displacement of a vehicle pedal according to claim 1, wherein said displacement controlling means is a regulating means in which an angle of inclination, with respect to the substantially vehicle transverse direction, of a wall surface of a rear portion wall of said regulating means is set greater than an angle of inclination, with respect to the substantially vehicle transverse direction, of a wall surface of a front portion wall of said regulating means.

10. A structure for controlling displacement of a vehicle pedal according to claim 9, wherein joined surfaces of the rear end portion of said pedal bracket and the second vehicle structural member are inclined substantially toward a bottom of the vehicle substantially along a direction toward the rear of the vehicle.

11. A structure comprising:
    a vehicle pedal including a rotating shaft portion and a stepping surface;
    a pedal bracket supporting the rotating shaft portion of the vehicle pedal, a front end portion of said pedal bracket connected to a first vehicle structural member and a rear end portion of said pedal bracket connected to a second vehicle structural member which is disposed at a vehicle rear side of the first vehicle structural member;
    separating means for disconnecting the connected rear end portion of said pedal bracket from the second vehicle structural member when an external force of a predetermined value or greater is applied to a front portion of the vehicle, which causes the first vehicle structural member to deform in a direction toward a rear portion of the vehicle such that said pedal bracket is displaced toward the rear of the vehicle, so as to separate and disconnect the rear end portion of said pedal bracket and the second vehicle structural member; and
    regulating means, disposed at the rear end portion of said pedal bracket, for controlling displacement of the stepping surface of the vehicle pedal by regulating displacement, in a vehicle transverse direction, of the rear end portion of said pedal bracket when the rear end portion has been separated from the second vehicle structural member, said regulating means being inclined outwardly toward a vehicle transverse direction with respect to a direction toward the rear of the vehicle, and positioned to interfere with movement of the rear end portion of said pedal bracket when the rear end portion has been separated from the second vehicle structural member.

12. A structure for controlling displacement of a vehicle pedal according to claim 11, wherein joined surfaces of the rear end portion of said pedal bracket and the second vehicle structure member are inclined in a direction toward a bottom of the vehicle with respect to a direction toward the rear of the vehicle.

13. A structure comprising:

a vehicle pedal including a rotating shaft portion and a stepping surface;

a pedal bracket supporting the rotating shaft portion of the vehicle pedal, a front end portion of said pedal bracket connected to a first vehicle structural member and a rear end portion of said pedal bracket connected to a second vehicle structural member which is disposed at a vehicle rear side of the first vehicle structural member;

separating means for disconnecting the connected rear end portion of said pedal bracket from the second vehicle structural member when an external force of a predetermined value or greater is applied to a front portion of the vehicle which causes the first vehicle structural member to deform in a direction toward a rear portion of the vehicle such that said pedal bracket is displaced toward the rear of the vehicle, so as to separate and disconnect the rear end portion of said pedal bracket and the second vehicle structure member; and guide means, disposed at the rear end portion of said pedal bracket, for controlling displacement of the stepping surface of the vehicle pedal by regulating displacement, in a vehicle transverse direction, of the rear end portion of said pedal bracket when the rear end portion has been separated from the second vehicle structural member, said guide means guiding the rear end portion of said pedal bracket, when the rear end portion has been separated from the second vehicle structural member, outwardly in a vehicle transverse direction with respect to a direction toward the rear of the vehicle.

14. A structure for controlling displacement of a vehicle pedal according to claim 13, wherein joined surfaces of the rear end portion of said pedal bracket and the second vehicle structural member are inclined toward a bottom of the vehicle with respect to a direction toward the rear of the vehicle.

* * * * *